(12) United States Patent
Okada et al.

(10) Patent No.: US 9,935,886 B2
(45) Date of Patent: Apr. 3, 2018

(54) PACKET EXTRACTING APPARATUS AND METHOD

(71) Applicant: FUJITSU LIMITED, Kawasaki-shi, Kanagawa (JP)

(72) Inventors: Sumiyo Okada, Kawasaki (JP); Yuji Nomura, Kawasaki (JP); Fumiyuki Iizuka, Kawasaki (JP); Naoyoshi Ohkawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 14/937,042

(22) Filed: Nov. 10, 2015

(65) Prior Publication Data

US 2016/0191398 A1 Jun. 30, 2016

(30) Foreign Application Priority Data

Dec. 24, 2014 (JP) ................. 2014-260685

(51) Int. Cl.
*H04L 12/26* (2006.01)
*H04L 12/841* (2013.01)
*H04L 1/00* (2006.01)
*H04L 12/807* (2013.01)

(52) U.S. Cl.
CPC .............. *H04L 47/283* (2013.01); *H04L 1/00* (2013.01); *H04L 47/27* (2013.01)

(58) Field of Classification Search
None
See application file for complete search history.

(56) References Cited

U.S. PATENT DOCUMENTS

| 2006/0034286 | A1 | 2/2006 | Koning et al. | |
| 2008/0181109 | A1 | 7/2008 | Igarashi et al. | |
| 2009/0268747 | A1* | 10/2009 | Kurata | H04L 1/1832 370/412 |
| 2009/0310500 | A1 | 12/2009 | Matsuda et al. | |
| 2011/0019555 | A1* | 1/2011 | Gotoh | H04W 52/0241 370/252 |
| 2012/0106376 | A1* | 5/2012 | Kikkawa | H04L 47/193 370/252 |

FOREIGN PATENT DOCUMENTS

| JP | 2008-508817 | 3/2008 |
| JP | 2008-182410 | 8/2008 |
| JP | 2009-303089 | 12/2009 |
| JP | 2013-78011 | 4/2013 |

* cited by examiner

*Primary Examiner* — Rebecca E Song
(74) *Attorney, Agent, or Firm* — Fujitsu Patent Center

(57) ABSTRACT

An operation unit detects that a received first ACK packet is an ACK packet transmitted in response to a single data packet. The operation unit determines whether to calculate a round trip time by using reception time of the first ACK packet on the basis of a window size included in the first ACK packet and a window size included in a second ACK packet acquired immediately before the first ACK packet. If the operation unit determines to calculate the round trip time, the operation unit outputs the round trip time calculated by using the reception time of the first ACK packet.

8 Claims, 16 Drawing Sheets

EXAMPLES IN WHICH DELAYED ACK PACKET IS USED

EXAMPLES OF COMMUNICATION OPERATION
PERFORMED BY WIRED TERMINAL

WHEN DELAYED ACK
PACKETS ARE NOT USED

WHEN DELAYED ACK
PACKETS ARE USED

EXAMPLES OF COMMUNICATION OPERATION
PERFORMED BY WIRELESS TERMINAL

WHEN DELAYED ACK
PACKETS ARE NOT USED

WHEN DELAYED ACK
PACKETS ARE USED

PACKET TABLE 111

FIG. 12

| No. | TIME | SA | SP | DA | DP | Protocol | TCP LEN | IP LEN | seq | next seq | ack | RTT | WS |
|---|---|---|---|---|---|---|---|---|---|---|---|---|---|
| ... | ... | ... | ... | ... | ... | ... | ... | ... | ... | ... | ... | ... | ... |
| 9 | 13:20:01.317465 | IP1 | a | IP2 | b | TCP | 1394 | 1434 | 4183 | 5577 | 479 | — | 15744 |
| 10 | 13:20:01.260971 | IP1 | a | IP2 | b | TCP | 1394 | 1434 | 5577 | 6971 | 479 | — | 15744 |
| 11 | 13:20:01.260975 | IP1 | a | IP2 | b | TCP | 1394 | 1434 | 6971 | 8365 | 479 | — | 15744 |
| 12 | 13:20:01.314492 | IP2 | b | IP1 | a | TCP | 0 | 40 | 479 | — | 1395 | 0.05354 | 17536 |
| 13 | 13:20:01.314538 | IP2 | b | IP1 | a | TCP | 0 | 40 | 479 | — | 2789 | 0.05358 | 20480 |
| 14 | 13:20:01.314598 | IP1 | a | IP2 | b | TCP | 1394 | 1434 | 8365 | 9759 | 479 | — | 15744 |
| 15 | 13:20:01.314612 | IP1 | a | IP2 | b | TCP | 1394 | 1434 | 9759 | 11153 | 479 | — | 15744 |
| 16 | 13:20:01.314618 | IP1 | a | IP2 | b | TCP | 1394 | 1434 | 11153 | 12547 | 479 | — | 15744 |
| 17 | 13:20:01.314626 | IP1 | a | IP2 | b | TCP | 1394 | 1434 | 12547 | 13941 | 479 | — | 15744 |
| 18 | 13:20:01.314631 | IP1 | a | IP2 | b | TCP | 1394 | 1434 | 13941 | 15335 | 479 | — | 15744 |
| 19 | 13:20:01.314636 | IP1 | a | IP2 | b | TCP | 1394 | 1434 | 15335 | 16729 | 479 | — | 15744 |
| 20 | 13:20:01.315472 | IP2 | b | IP1 | a | TCP | 0 | 40 | 479 | — | 5577 | 0.05451 | 26304 |
| 21 | 13:20:01.315502 | IP1 | a | IP2 | b | TCP | 1394 | 1434 | 16729 | 18123 | 479 | — | 15744 |
| 22 | 13:20:01.315511 | IP2 | b | IP1 | a | TCP | 0 | 40 | 479 | — | 4183 | — | 23360 |
| 23 | 13:20:01.317465 | IP2 | b | IP1 | a | TCP | 0 | 40 | 479 | — | 6971 | 0.05649 | 29248 |
| 24 | 13:20:01.317483 | IP2 | b | IP1 | a | TCP | 0 | 40 | 479 | — | 8365 | 0.05651 | 32128 |
| 25 | 13:20:01.317512 | IP1 | a | IP2 | b | TCP | 1394 | 1434 | 18123 | 19517 | 479 | — | 15744 |
| 26 | 13:20:01.317518 | IP1 | a | IP2 | b | TCP | 1394 | 1434 | 19517 | 20911 | 479 | — | 15744 |
| 27 | 13:20:01.317522 | IP1 | a | IP2 | b | TCP | 1394 | 1434 | 20911 | 22305 | 479 | — | 15744 |
| 28 | 13:20:01.317526 | IP1 | a | IP2 | b | TCP | 1394 | 1434 | 22305 | 23699 | 479 | — | 15744 |
| 29 | 13:20:01.317531 | IP1 | a | IP2 | b | TCP | 1394 | 1434 | 23699 | 25093 | 479 | — | 15744 |
| ... | ... | ... | ... | ... | ... | ... | ... | ... | ... | ... | ... | ... | ... |

PACKET TABLE 111

| No. | TIME | SA | SP | DA | DP | Protocol | TCP LEN | IP LEN | seq | next seq | ack | RTT | WS |
|---|---|---|---|---|---|---|---|---|---|---|---|---|---|
| ... | ... | ... | ... | ... | ... | ... | ... | ... | ... | ... | ... | ... | ... |
| 30 | 13:20:01.354380 | IP2 | b | IP1 | a | TCP | 0 | 40 | 479 | — | 9759 | 0.03978 | 35072 |
| 31 | 13:20:01.354414 | IP1 | a | IP2 | b | TCP | 1394 | 1434 | 25093 | 26487 | 479 | — | 15744 |
| 32 | 13:20:01.363385 | IP2 | b | IP1 | a | TCP | 0 | 40 | 479 | — | 11153 | 0.04877 | 38016 |
| 33 | 13:20:01.363403 | IP2 | b | IP1 | a | TCP | 0 | 40 | 479 | — | 12547 | 0.04879 | 40896 |
| 34 | 13:20:01.363454 | IP1 | a | IP2 | b | TCP | 1394 | 1434 | 26487 | 27881 | 479 | — | 15744 |
| 35 | 13:20:01.363468 | IP1 | a | IP2 | b | TCP | 1394 | 1434 | 27881 | 29275 | 479 | — | 15744 |
| 36 | 13:20:01.363476 | IP1 | a | IP2 | b | TCP | 1394 | 1434 | 29275 | 30669 | 479 | — | 15744 |
| 37 | 13:20:01.363484 | IP1 | a | IP2 | b | TCP | 1394 | 1434 | 30669 | 32063 | 479 | — | 15744 |
| 38 | 13:20:01.363493 | IP1 | a | IP2 | b | TCP | 1394 | 1434 | 32063 | 33457 | 479 | — | 15744 |
| 39 | 13:20:01.364357 | IP2 | b | IP1 | a | TCP | 0 | 40 | 479 | — | 13941 | 0.04973 | 43840 |
| 40 | 13:20:01.364381 | IP1 | a | IP2 | b | TCP | 1394 | 1434 | 33457 | 34851 | 479 | — | 15744 |
| 41 | 13:20:01.365347 | IP2 | b | IP1 | a | TCP | 0 | 40 | 479 | — | 15335 | 0.05072 | 46720 |
| 42 | 13:20:01.366360 | IP2 | b | IP1 | a | TCP | 0 | 40 | 479 | — | 16729 | 0.05172 | 49664 |
| 43 | 13:20:01.367356 | IP2 | b | IP1 | a | TCP | 0 | 40 | 479 | — | 18123 | 0.05185 | 52608 |
| 44 | 13:20:01.367379 | IP2 | b | IP1 | a | TCP | 0 | 40 | 479 | — | 19517 | 0.04987 | 55488 |
| 45 | 13:20:01.367418 | IP1 | a | IP2 | b | TCP | 1394 | 1434 | 34851 | 36245 | 479 | — | 15744 |
| 46 | 13:20:01.367431 | IP1 | a | IP2 | b | TCP | 1394 | 1434 | 36245 | 37639 | 479 | — | 15744 |
| ... | ... | ... | ... | ... | ... | ... | ... | ... | ... | ... | ... | ... | ... |

FIG. 13

OUTPUT EXAMPLE

| | | |
|---|---|---|
| 1 | Time | 2013/7/16 13:21:00 |
| 2 | HostA_Address | IP1 |
| 3 | HostA_Port | a |
| 4 | HostB_Address | IP2 |
| 5 | HostB_port | b |
| 6 | Start_Time | 2013/7/16 13:20:00 |
| 7 | End_Time | 2013/7/16 13:20:59 |
| 8 | HostA_RTT_Count | 221 |
| 9 | HostA_RTT_Avg | 118387 |
| 10 | HostA_RTT_Std | 50202 |
| 11 | HostA_RTT_Min | 37070 |
| 12 | HostA_RTT_Max | 254796 |
| 13 | HostB_RTT_Count | 2 |
| 14 | HostB_RTT_Avg | 34 |
| 15 | HostB_RTT_Std | 2 |
| 16 | HostB_RTT_Min | 32 |
| 17 | HostB_RTT_Max | 36 |

PACKET TABLE 111a

| No. | TIME | SA | SP | DA | DP | Protocol | TCP LEN | IP LEN | seq | ack | ACK DIFFERENCE | RTT | WS |
|---|---|---|---|---|---|---|---|---|---|---|---|---|---|
| ... | ... | ... | ... | ... | ... | ... | ... | ... | ... | ... | ... | ... | ... |
| 23 | 13:20:01.317465 | IP2 | b | IP1 | a | TCP | 0 | 40 | 479 | 6971 | 1394 | 0.05649 | 29248 |
| 24 | 13:20:01.317483 | IP2 | b | IP1 | a | TCP | 0 | 40 | 479 | 8365 | 1394 | 0.05651 | 32128 |
| 30 | 13:20:01.354380 | IP2 | b | IP1 | a | TCP | 0 | 40 | 479 | 9759 | 1394 | 0.03978 | 35072 |
| 32 | 13:20:01.363385 | IP2 | b | IP1 | a | TCP | 0 | 40 | 479 | 11153 | 1394 | 0.04877 | 38016 |
| 33 | 13:20:01.363403 | IP2 | b | IP1 | a | TCP | 0 | 40 | 479 | 12547 | 1394 | 0.04879 | 40896 |
| 39 | 13:20:01.364357 | IP2 | b | IP1 | a | TCP | 0 | 40 | 479 | 13941 | 1394 | 0.04973 | 43840 |
| 41 | 13:20:01.365347 | IP2 | b | IP1 | a | TCP | 0 | 40 | 479 | 15335 | 1394 | 0.05072 | 46720 |
| 42 | 13:20:01.366360 | IP2 | b | IP1 | a | TCP | 0 | 40 | 479 | 16729 | 1394 | 0.05172 | 49664 |
| 43 | 13:20:01.367356 | IP2 | b | IP1 | a | TCP | 0 | 40 | 479 | 18123 | 1394 | 0.05185 | 52608 |
| 44 | 13:20:01.367379 | IP2 | b | IP1 | a | TCP | 0 | 40 | 479 | 19517 | 1394 | 0.04987 | 55488 |
| ... | ... | ... | ... | ... | ... | ... | ... | ... | ... | ... | ... | ... | ... |
| 516 | 13:20:02.150309 | IP2 | b | IP1 | a | TCP | 0 | 40 | 479 | 358259 | 5576 | 0.18666 | 522880 |
| 517 | 13:20:02.150318 | IP2 | b | IP1 | a | TCP | 0 | 40 | 479 | 361047 | 2788 | 0.18666 | 522880 |
| 548 | 13:20:02.160298 | IP2 | b | IP1 | a | TCP | 0 | 40 | 479 | 363835 | 2788 | 0.19663 | 522880 |
| 552 | 13:20:02.160370 | IP2 | b | IP1 | a | TCP | 0 | 40 | 479 | 366623 | 2788 | 0.19670 | 522880 |
| 555 | 13:20:02.165279 | IP2 | b | IP1 | a | TCP | 0 | 40 | 479 | 369411 | 2788 | 0.20159 | 522880 |
| 556 | 13:20:02.174256 | IP2 | b | IP1 | a | TCP | 0 | 40 | 479 | 372199 | 2788 | 0.21056 | 522880 |
| 557 | 13:20:02.198452 | IP2 | b | IP1 | a | TCP | 0 | 40 | 479 | 374987 | 2788 | 0.22598 | 522880 |
| 558 | 13:20:02.198487 | IP2 | b | IP1 | a | TCP | 0 | 40 | 479 | 377775 | 2788 | 0.22600 | 522880 |
| 559 | 13:20:02.237316 | IP2 | b | IP1 | a | TCP | 0 | 40 | 479 | 380563 | 2788 | 0.19088 | 522880 |
| ... | ... | ... | ... | ... | ... | ... | ... | ... | ... | ... | ... | ... | ... |

PACKET EXTRACTING APPARATUS AND METHOD

CROSS-REFERENCE TO RELATED APPLICATION

This application is based upon and claims the benefit of priority of the prior Japanese Patent Application No. 2014-260685, filed on Dec. 24, 2014, the entire contents of which are incorporated herein by reference.

FIELD

The embodiments discussed herein relate to a packet extracting device and a packet extracting method.

BACKGROUND

Today, a plurality of information processing apparatuses such as computers are connected to a network, and data communication is performed between apparatuses via the network. The Transmission Control Protocol/Internet Protocol (TCP/IP) is known as a protocol for packetizing and transmitting data on a network.

In addition, there are cases in which packets flowing on a network are collected and accumulated in a predetermined apparatus and in which the communication quality of the network is monitored on the basis of the collected packets. For example, there are cases in which the round trip time (RTT) of a data communication is measured on the basis of the difference between the arrival time of a data packet and the arrival time of an acknowledgement (ACK) packet in response to the data packet. By using such RTTs, the communication quality can be evaluated or congestion control can be performed.

See, for example, the following documents:
Japanese Laid-open Patent Publication No. 2013-78011
Japanese Laid-open Patent Publication No. 2008-182410
Japanese National Publication of International Patent Application No. 2008-508817

Among such ACK packets, there are delayed ACK packets. When a destination device receives a data packet transmitted from a source device, there are cases in which the destination device transmits a delayed ACK packet. By using such a delayed ACK packet, the destination device can delay transmission of an ACK packet to the source device. For example, the destination device transmits a single delayed ACK packet in response to a plurality of data packets that the destination device has received. In addition, the destination device also transmits an ACK packet if a predetermined period of time elapses before the destination device receives a predetermined number of data packets. Namely, the destination device also transmits an ACK packet if a timeout occurs. In this case, an RTT can still be calculated by using an ACK packet transmitted in response to one data packet among the collected packets. However, since a delayed ACK packet could be transmitted by a timeout, the measurement accuracy of the RTT could be deteriorated. This is because transmission of a delayed ACK packet by a timeout is attributable to the standby time of the destination device and is not related to any delay in the transmission paths on the network.

If a timeout value for such delayed ACK packets is fixed, RTTs can still be calculated by excluding the ACK packets transmitted by the timeout value. However, since the timeout value can vary, it is not easy to exclude the impact caused by a timeout.

SUMMARY

According to one aspect, there is provided a packet extracting apparatus including: a first memory configured to hold a sequence number included in a data packet transmitted from a source apparatus to a destination apparatus, a size of the data packet, and time at which the data packet is received, which are associated with each other; a second memory configured to hold an ACK number and a window size included in an ACK packet transmitted in response from the destination apparatus to the source apparatus and time at which the ACK packet is received, which are associated with each other; and a processor configured to perform a procedure including: referring to the first and second memories, determining, when a first ACK packet is an ACK packet transmitted in response to a single first data packet, whether to calculate a round trip time by using reception time of the first ACK packet on the basis of a window size included in the first ACK packet and a window size included in a second ACK packet acquired immediately before the first ACK packet, and outputting, when the processor determines to calculate the round trip time, the round trip time calculated by using the reception time of the first ACK packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A to 8C illustrate examples of headers;

FIG. 12 illustrates an example of a part of a packet table;

FIG. 13 illustrates an example of another part of the packet table;

FIG. 14 illustrates an output example;

FIG. 16 illustrates examples of RTT measurement results.

DESCRIPTION OF EMBODIMENTS

Figure 1:
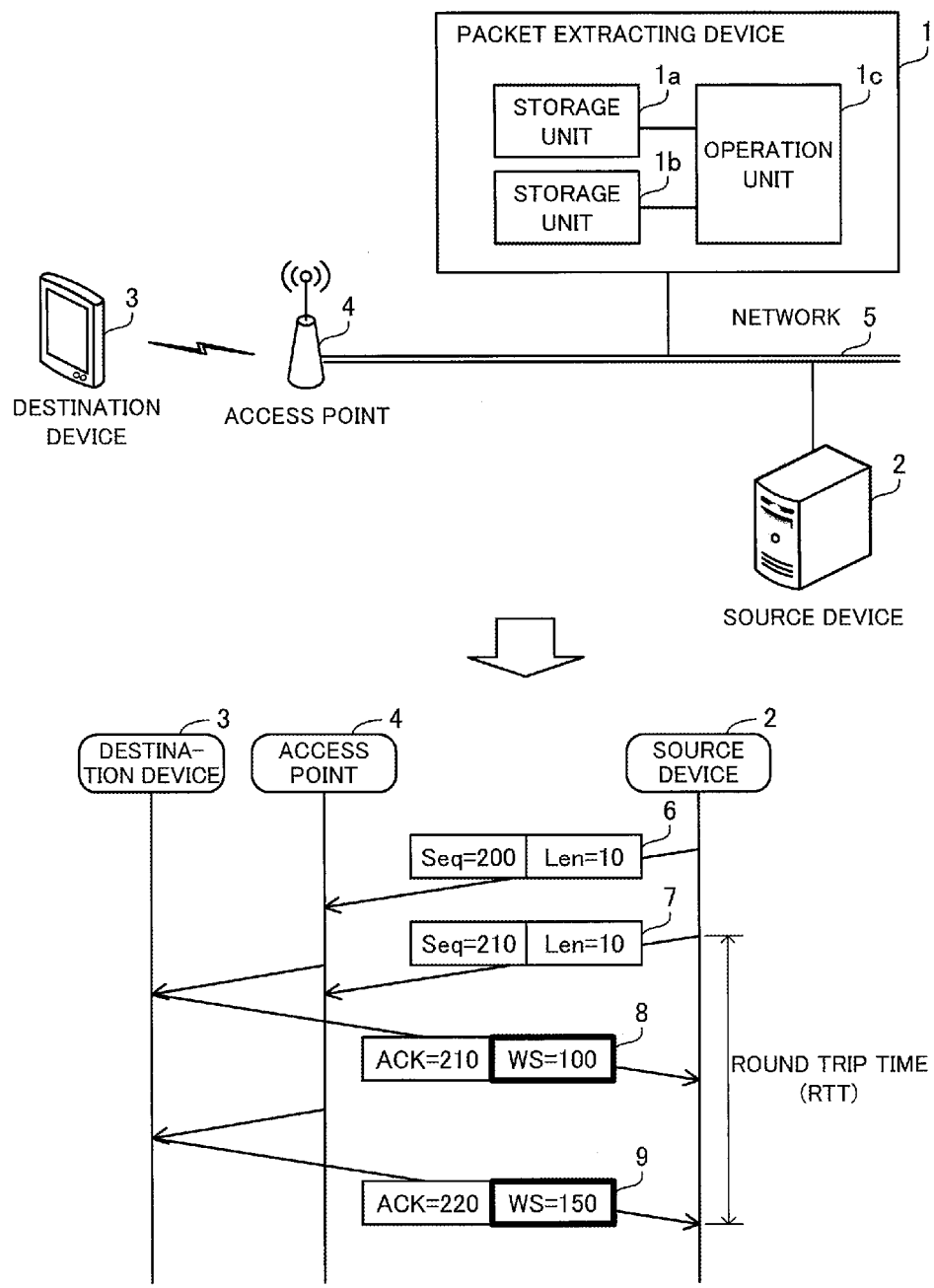
FIG. 1 illustrates a packet extracting device according to a first embodiment.

Embodiments will be described below with reference to the accompanying drawings, wherein like reference numerals refer to like elements throughout.

First Embodiment

FIG. 1 illustrates a packet extracting device 1 according to a first embodiment. An information processing system according to the first embodiment includes the packet extracting device 1, a source device 2, a destination device 3, and an access point 4. The packet extracting device 1, the source device 2, and the access point 4 are connected to a network 5. The source device 2 and the destination device 3 are information processing apparatuses such as computers. For example, the access point 4 is a wireless base station, and the network 5 is a wired network. The destination device 3 and the access point 4 are connected wirelessly. The source device 2 and the destination device 3 perform data communication via the access point 4 and the network 5. TCP/IP is used as a communication protocol between the source device 2 and the destination device 3.

The packet extracting device 1 collects packets exchanged via the network 5 and monitors the communication quality on the basis of the collected packets. For example, the packet extracting device 1 is connected to a relay device or a tap that relays packets on the network 5. The relay device or the tap duplicates packets exchanged between the source device 2 and the destination device 3 and transmits the packets to the packet extracting device 1. The packet extracting device 1 collects necessary packets by receiving the duplicated packets.

The packets collected by the packet extracting device 1 include data packets transmitted from the source device 2 to the destination device 3 and acknowledgement (ACK) packets transmitted from the destination device 3 to the source device 2. Even if a plurality of destination devices or source devices exist, the packet extracting device 1 is able to distinguish packets exchanged between the source device 2 and the destination device 3 by referring to the IP addresses of the source device 2 and the destination device 3 included in the relevant packets. In addition to the IP addresses, the packet extracting device 1 may refer to a combination of port numbers included in the packets. In this way, the packet extracting device 1 is able to identify a combination of applications executed on these apparatuses. As needed, a logical communication path used exclusively by such combination of applications between the source device 2 and the destination device 3 will be referred to as a connection.

The packet extracting device 1 measures a round trip time (RTT) on the basis of the reception time of a data packet transmitted from the source device 2 and the reception time of an ACK packet transmitted from the destination device 3 in response to the data packet. The packet extracting device 1 uses such measured RTTs to evaluate the communication quality between the source device 2 and the destination device 3. The packet extracting device 1 refers to the sequence number and the data length written in TCP header fields included in a packet. In this way, the packet extracting device 1 determines whether an ACK packet corresponds to one or a plurality of data packets.

Next, use of a delayed ACK packet as an ACK packet will be described. Specifically, there are cases in which the destination device 3 transmits normal ACK packets (each of the ACK packets is transmitted in response to a single data packet), not delayed ACK packets, in a certain period (for example, in a period immediately after a communication is started) and transmits delayed ACK packets in another period. In these cases, the packet extracting device 1 collects the following ACK packets.

In a first case, the packet extracting device 1 collects ACK packets transmitted in a period in which delayed ACK packets are not used (in a period in which each of the ACK packets is transmitted in response to a single data packet) (these ACK packets will be referred to as the ACK packets in the first case). In a second case, the packet extracting device 1 collects ACK packets transmitted after the destination device 3 receives a predetermined number (two or more) of data packets in a period in which delayed ACK packets are used. In a third case, the packet extracting device 1 collects ACK packets transmitted before the destination device 3 receives the predetermined number of data packets, namely, ACK packets transmitted in response to a timeout, in a period in which delayed ACK packets are used (these ACK packets will be referred to as the ACK packets in the third case). A single ACK packet transmitted after the destination device 3 receives a single data packet and a timeout occurs is included in the ACK packets in the third case.

Thus, when the packet extracting device 1 identifies a single ACK packet that has been transmitted in response to a single data packet on the basis of the sequence number and the data length written in the respective TCP header fields, the packet extracting device 1 could determine either an ACK packet in the first case or an ACK packet in the third case. Therefore, if the packet extracting device 1 simply calculates an RTT by extracting a single ACK packet transmitted in response to a single data packet from the collected packets, the impact of a timeout could be included in the RTT. As a result, the RTT calculation accuracy could be deteriorated. This is because transmission of a delayed ACK packet by a timeout is attributable to the standby time of the destination device 3 and is not related to any delay in the transmission paths on the network. Namely, to monitor delay caused by any of the transmission paths on the network, it is preferable that each RTT be measured without involving any delayed ACK packet transmitted by a timeout.

To this end, as will be described below, the packet extracting device 1 extracts information about an ACK packet used for calculating an RTT. The packet extracting device 1 includes storage units 1a and 1b and an operation unit 1c.

Each of the storage units 1a and 1b may be a volatile storage device such as a random access memory (RAM) or a non-volatile storage device such as a hard disk drive (HDD) or a flash memory. The storage units 1a and 1b may be realized by two storage areas arranged in a single volatile storage device or a non-volatile storage device. The operation unit 1c includes a processor, for example. The processor may be a central processing unit (CPU) or a digital signal processor (DSP) or may be an electronic circuit for specific use such as an application specific integrated circuit (ASIC) or a field programmable gate array (FPGA). The processor may include a plurality of processors (a multiprocessor). The processor may execute a program stored in the storage unit 1a, for example.

The storage unit 1a holds the sequence number included in an individual data packet transmitted from the source device 2 to the destination device 3 and the reception time of the data packet, which are associated with each other. The storage unit 1b holds the ACK number and the window size of an individual ACK packet transmitted from the destination device 3 to the source device 2 and the reception time of the ACK packet, which are associated with each other.

When the operation unit 1c receives a data packet transmitted from the source device 2 to the destination device 3, the operation unit 1c associates the sequence number included in the data packet with the reception time of the data packet and stores the associated information in the storage unit 1a. For example, when the operation unit 1c receives a data packet 6, the operation unit 1c associates the sequence number (Seq) "200" included in the data packet 6 with the reception time of the data packet 6 and stores the associated information in the storage unit 1a. The TCP data length (Len) of the data packet 6 is "10." Next, when the operation unit 1c receives a data packet 7, the operation unit 1c associates the sequence number "210" included in the data packet 7 with the reception time of the data packet 7 and stores the associated information in the storage unit 1a.

Next, when the operation unit 1c receives an ACK packet transmitted from the destination device 3 to the source device 2, the operation unit 1c associates the ACK number and the window size included in the ACK packet and the reception time of the ACK packet and stores the associated information in the storage unit 1b. The window size represents a data size that the source device 2 can transmit before the source device 2 receives an ACK packet from the destination device 3. The destination device 3 transmits an ACK packet including a window size setting value to the source device 2. The window size is also referred to as a receive window size (RWIN). For example, when the operation unit 1c receives an ACK packet 8, the operation unit 1c associates the ACK number (ACK) "210" and the window size (WS) "100" included in the ACK packet 8 with the reception time of the ACK packet 8 and stores the associated information in the storage unit 1b. When the operation unit 1c receives an ACK packet 9, the operation unit 1c associates the ACK number "220" and the window size "150" included in the ACK packet 9 with the reception time of the ACK packet 9 and stores the associated information in the storage unit 1b.

The operation unit 1c refers to the storage units 1a and 1b and determines whether a first ACK packet among the acquired ACK packets is an ACK packet that has been transmitted in response to a single first data packet. The sum of the sequence number and the size of a data packet matches the ACK number of an ACK packet transmitted in response to the data packet. Thus, for example, the operation unit 1c searches the acquired data packets for a data packet, the sum of the sequence number and the size of the data packet matching the ACK number of the first ACK packet. If such data packet exists, the operation unit 1c determines this data packet to be the first data packet corresponding to the first ACK packet. Namely, the first ACK packet is a packet transmitted in response to the first data packet.

If the operation unit 1c finds a second ACK packet whose ACK number matches the sequence number of the first data packet, the operation unit 1c determines the first ACK packet to be an ACK packet transmitted in response to the first data packet alone. This is because the ACK number of a first ACK packet is larger than the ACK number of a second ACK packet by the size of the first data packet. If there is the second ACK packet, the difference between the ACK numbers of the first and second ACK packets matches the size of the first data packet, the operation unit 1c also determines that the first ACK packet is an ACK packet transmitted in response to the first data packet alone.

For example, the sum "220" of the sequence number "210" and the size "10" of the data packet 7 matches the ACK number "220" of the ACK packet 9. Thus, a data packet corresponding to the ACK packet 9 (corresponding to the first ACK packet) is the data packet (corresponding to the first data packet). In addition, the operation unit 1c finds the ACK packet 8 (corresponding to the second ACK packet) whose ACK number "210" matches the sequence number "210" of the data packet 7. Alternatively, by determining that the difference between the ACK number of the ACK packet 8 and the ACK number of the ACK packet 9 matches the size "10" of the data packet 7, the operation unit 1c may determine the ACK packet 8 to be the second ACK packet. Since the ACK packet 8 exists, the ACK packet 9 is an ACK packet transmitted in response to the data packet 7 alone.

When the first ACK packet is an ACK packet transmitted in response to a single data packet, the operation unit 1c determines whether to calculate an RTT by using the reception time of the first ACK packet on the basis of the window size included in the second ACK packet acquired immediately before the first ACK packet and the window size included in the first ACK packet. For example, when the destination device 3 and the access point 4 perform a wireless communication as described above, if the window size included in the first ACK packet is equal to or more than the window size included in the second ACK packet, the operation unit 1c determines to calculate an RTT by using the reception time of the first ACK packet. In contrast, if the window size included in the first ACK packet is less than the window size included in the second ACK packet, the operation unit 1c determines not to calculate an RTT by using the reception time of the first ACK packet. Why these window sizes are used for determining whether to calculate an RTT will be described below.

There are cases in which the destination device 3, which is capable of performing a wireless communication, performs a control operation of using a small window size initially and increasing the window size gradually. A communication in a wireless section could be slower and less stable than that in a wired section. Thus, by starting a communication with a relatively low communication rate, the source device 2 is prevented from transmitting too many data packets with respect to the communication amount usable in the wireless section. In addition, since the communication rate in the wireless section is less than that in a wired section, the difference between the time at which the data packet 6 arrives at the destination device 3 and the time at which the data packet 7 arrives at the destination device 3 is larger than the difference between the time at which the data packet 6 arrives at the access point 4 and the time at which the data packet 7 arrives at the access point 4. Thus, when the destination device 3 uses a delayed ACK packet when the window size is relatively small (even when the destination device 3 is able to increase the window size), if the destination device 3 waits for the next data packet until a timeout and if the delay until transmission of an ACK packet is accordingly increased, the network utilization efficiency could be deteriorated conversely.

Thus, it is conceivable that, when the destination device 3 is able to increase the window size, better network utilization efficiency can be achieved by causing the destination device 3 to transmit a single ACK packet in response to a single data packet rather than to transmit a delayed ACK packet. Based on such grounds, there are cases in which, when the destination device 3 is able to increase the window size, the destination device 3 transmits a single ACK packet in response to a single data packet, instead of using a delayed ACK packet. Thus, when the first ACK packet is an ACK packet transmitted in response to a single data packet and when the window size included in the first ACK packet is equal to or more than the window size included in the second ACK packet, the operation unit 1c estimates that the first ACK packet is not a delayed ACK packet.

More specifically, the window size "150" included in the ACK packet 9 (corresponding to the first ACK packet) is larger than the window size "100" included in the ACK packet 8 (corresponding to the second ACK packet). In this case, the operation unit 1c determines that the ACK packet 9 is not a delayed ACK packet. Thus, the operation unit 1c determines to calculate an RTT by using the reception time of the ACK packet 9.

When the operation unit 1c can calculate an RTT by using the reception time of the first ACK packet, the operation unit 1c outputs the RTT calculated by using the reception time. For example, the operation unit 1c calculates the difference between the reception time of the data packet 7 and the reception time of the ACK packet 9 as an RTT and outputs the RTT. In FIG. 1, the difference between the time at which the source device 2 transmits the data packet 7 and the time at which the source device 2 receives the ACK packet 9 (the difference between the transmission time and the reception time in the source device 2) is indicated as an RTT. If the packet extracting device 1 is located near the source device 2 on the network 5, it is fair to say that the time difference in the source device 2 substantially matches the RTT measured by the packet extracting device 1.

As described above, by referring to the window sizes of the collected ACK packets, the packet extracting device 1 extracts ACK packets other than the delayed ACK packets from the ACK packets each of which has been transmitted in response to a single data packet. In this way, the packet extracting device 1 extracts packets that can be used for calculating RTTs from the ACK packets each of which has been transmitted in response to a single data packet.

In addition, since the packet extracting device 1 calculates RTTs without using the delayed ACK packets affected by a timeout, the RTT measurement accuracy is improved. Each of these RTTs is used as an index representing the network quality. Thus, since the RTT measurement accuracy is improved, the network quality is estimated more accurately.

In addition, if it is clear that delayed ACK packets are constantly used, for example, a method discussed in Japanese Laid-open Patent Publication No. 2009-303089 may be used to measure RTTs so that the delayed ACK packets affected by a timeout are not used. More specifically, when delayed ACK packets are used so that a single delayed ACK packet is transmitted in response to two data packets, only ACK packets, each of which has been transmitted in response to two data packets, are used to calculate RTTs. ACK packets, each of which has been transmitted in response to a single data packet, are not used to measure RTTs. However, if this method is applied to a device such as the destination device 3 that switches use and non-use of delayed ACK packets, when delayed ACK packets are not used, RTTs cannot be measured from the collected packets.

In contrast, the packet extracting device 1 is able to measure RTTs from the collected packets even when a device such as the destination device 3 that switches use and non-use of delayed ACK packets does not use delayed ACK packets. Thus, the packet extracting device 1 measures more RTTs. As a result, since the packet extracting device 1 detects change of the RTTs more closely, the network is monitored more closely.

Second Embodiment

Figure 2:
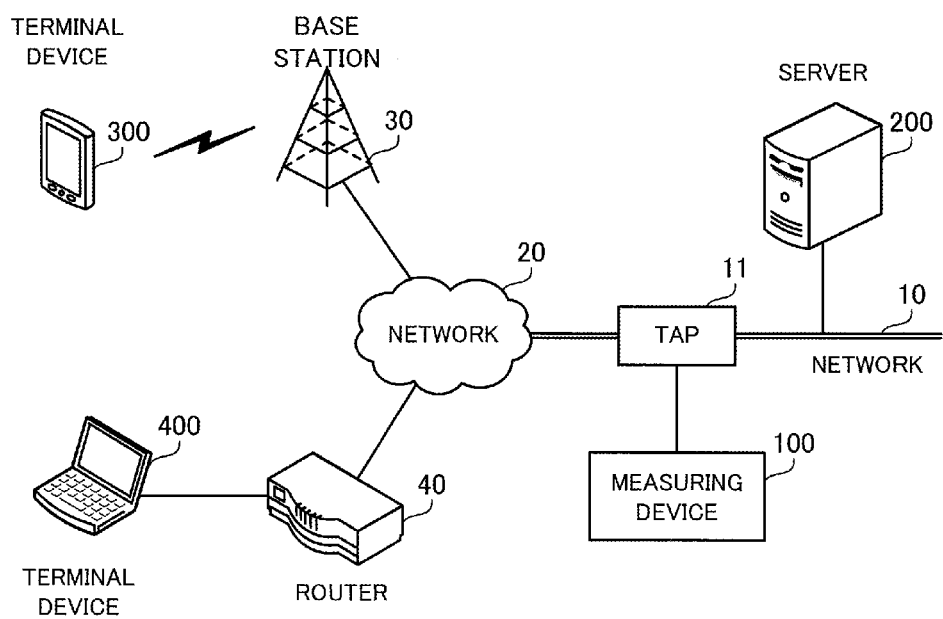
FIG. 2 illustrates an example of an information processing system according to a second embodiment.

FIG. 2 illustrates an example of an information processing system according to a second embodiment. The information processing system according to the second embodiment includes a measuring device 100, a server 200, and terminal devices 300 and 400. The server 200 and the terminal device 300 communicate with each other via networks 10 and 20 and a base station 30. The server 200 and the terminal device 400 communicate with each other via the networks 10 and 20 and a router 40. For example, the network 10 is a local area network (LAN). For example, the network 20 is a wide area network (WAN) or the Internet.

The network 10 is connected to the network 20, and the server 200 is connected to the network 10. The network 10 is provided with a tap 11, which is connected to the measuring device 100. The tap 11 relays packets, duplicates packets that it relays, and transmits the duplicated packets to the measuring device 100. The tap 11 may be replaced by, for example, a switch including a function of duplicating packets that pass through a predetermined port and outputting the duplicated packets from another port (a port to which the measuring device 100 is connected) as well (the function may be referred to as a port-mirroring function).

The network 20 is connected to the base station 30 and the router 40. A network for mobile communication may exist between the network 20 and the base station 30. A network (such as a LAN or a WAN) other than the networks 10 and 20 may exist between the network 20 and the router 40.

The base station 30 relays the communication between the server 200 and the terminal device 300. For example, High-Speed Downlink Packet Access (HSDPA) or Long Term Evolution (LTE) may be used for the communication between the base station 30 and the terminal device 300. The router 40 relays the communication between the server 200 and the terminal device 400. The section between the base station 30 and the terminal device 300 is a wireless section. The sections among the other devices are wired sections based on Ethernet (trademark). In the information processing system according to the second embodiment, a location near the server 200 will be referred to as an upstream location, and a location near the terminal device 300 or 400 will be referred to as a downstream location, as needed.

The measuring device 100 is a computer that holds and analyzes packets received from the tap 11. For example, the measuring device 100 performs passive measurements at an upstream location near the server 200 (a technique of observing signals exchanged between an end terminal and a server and obtaining an index, as such for network quality, from the behavior of the signals). The measuring device 100 measures RTTs on the basis of received packets and contributes to detecting deterioration of the communication quality of the network and improving the communication quality. The measuring device 100 is an example of the packet extracting device 1 illustrated as an example in the first embodiment.

The server 200 is a server computer that provides the terminal devices 300 and 400 with predetermined services. The terminal device 300 is a wireless terminal device such as a mobile phone, a smartphone, or a tablet device that can be used by a user. The terminal device 400 is a terminal device such as a client computer that can be used by a user. TCP/IP is used for the communication between the server 200 and the terminal device 300 and the communication between the server 200 and the terminal device 400.

The data size that the server 200 can transmit to a certain terminal device without receiving an ACK packet as a response from the terminal device is referred to as a window size. Each of the terminal devices 300 and 400 notifies the server 200 of its window size. The window size affects the network utilization efficiency. Next, a relationship between a window size and network utilization efficiency will be described by taking the communication between the server 200 and the terminal device 400 as an example.

Figure 3:
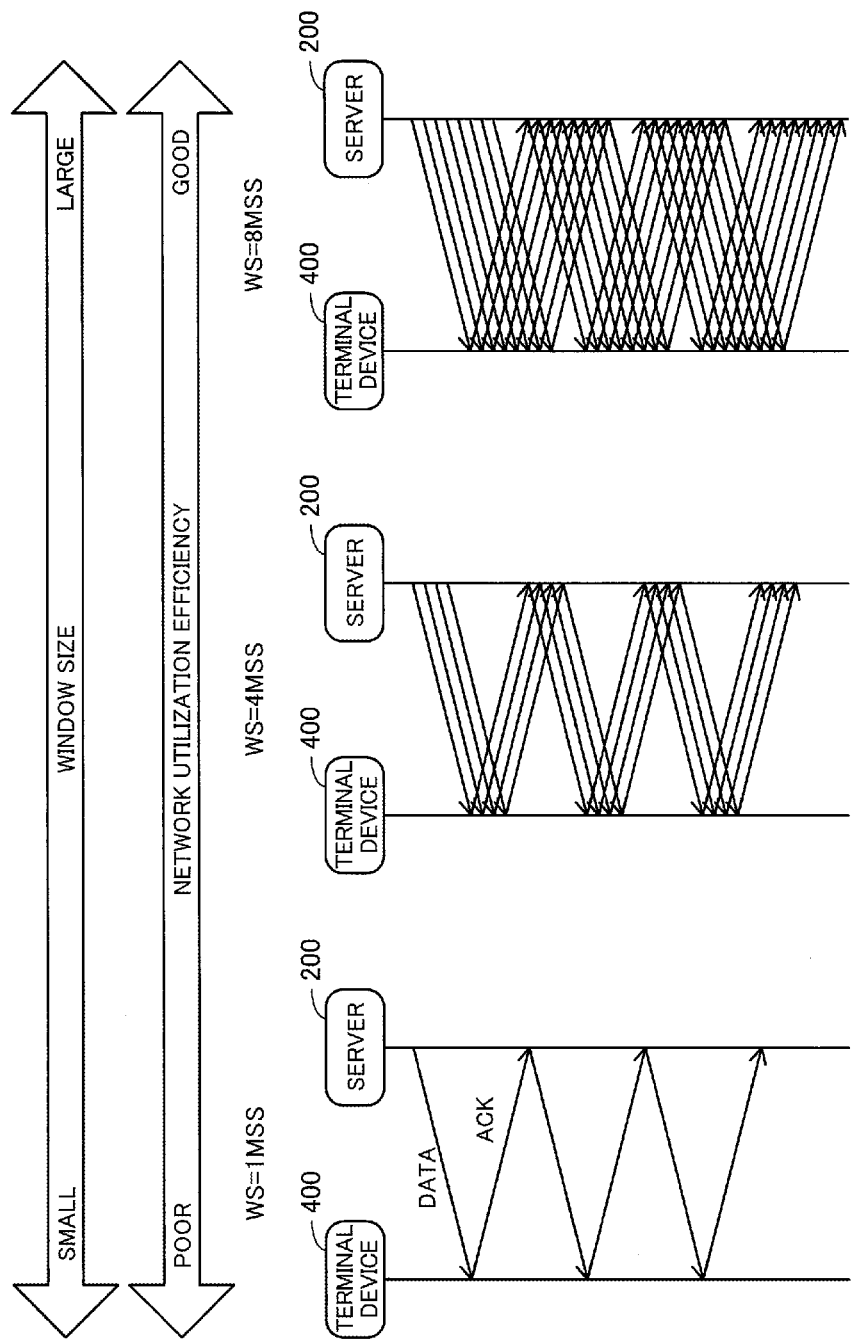
FIG. 3 illustrates an example of a relationship between a window size and network utilization efficiency.

FIG. 3 illustrates an example of a relationship between a window size and network utilization efficiency. In the example in FIG. 3, cases in which delayed ACK packets are not used are illustrated. For example, in a relatively fast transmission path as in a wired network, there is a tendency that the larger the window size (which is abbreviated as WS in the drawings as needed) is, the better the network utilization efficiency becomes. This is because, if the window size is larger, the average of time for which the server 200 waits until the server 200 can transmit the next data packet is reduced. Hereinafter, for better distinction between an ACK packet and a data packet, a data packet will be denoted by "a DATA packet," as needed.

For example, a case in which the window size is the maximum segment size (1 MSS) will be described (MSS×1). The MSS is a maximum payload size permitted for a single TCP segment. In this case, the server 200 transmits a single DATA packet (which will be denoted by "DATA" in FIG. 3) to the terminal device 400. When the terminal device 400 receives this DATA packet, the terminal device 400 transmits an ACK packet to the server 200. When the server 200 receives this ACK packet (which will be denoted by "ACK" in FIG. 3), the server 200 transmits the next DATA packet.

If the window size is 4 MSS (MSS×4), the server 200 can transmit four DATA packets without receiving the corresponding ACK packets from the terminal device 400. Likewise, for example, if the window size is 8 MSS (MSS×8), the server 200 can transmit eight DATA packets without receiving the corresponding ACK packets from the terminal device 400.

However, if the terminal device 400 transmits an ACK packet to the server 200 immediately after receiving a single DATA packet, there are cases in which the terminal device 400 includes a window size smaller than the current window size in the ACK packet to be transmitted. This is because, when the terminal device 400 transmits the ACK packet, a DATA packet that has not been processed yet by the terminal device 400 could still remain in a buffer in the terminal device 400.

Thus, a delayed ACK packet is used. By delaying transmission of an ACK packet, the terminal device 400 can transmit an ACK packet when the terminal device 400 has fewer unprocessed DATA packets (when the buffer has more free space). In this way, the chance that the terminal device 400 specifies a window size smaller than the current window size is reduced. In addition, the number of ACK packets flowing through the networks 10 and 20 is reduced.

Figure 4A:
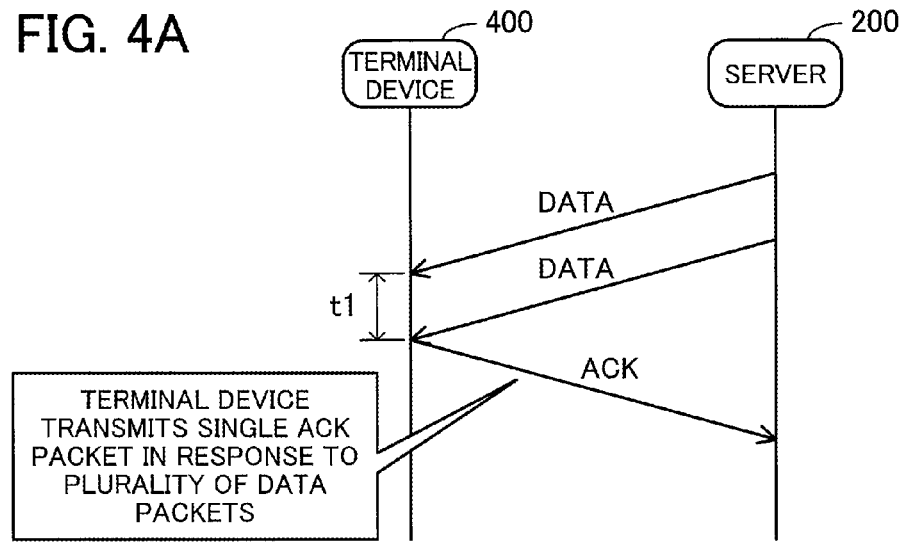
FIGS. 4A and 4B illustrate examples in which delayed ACK packets are used.
Figure 4B:
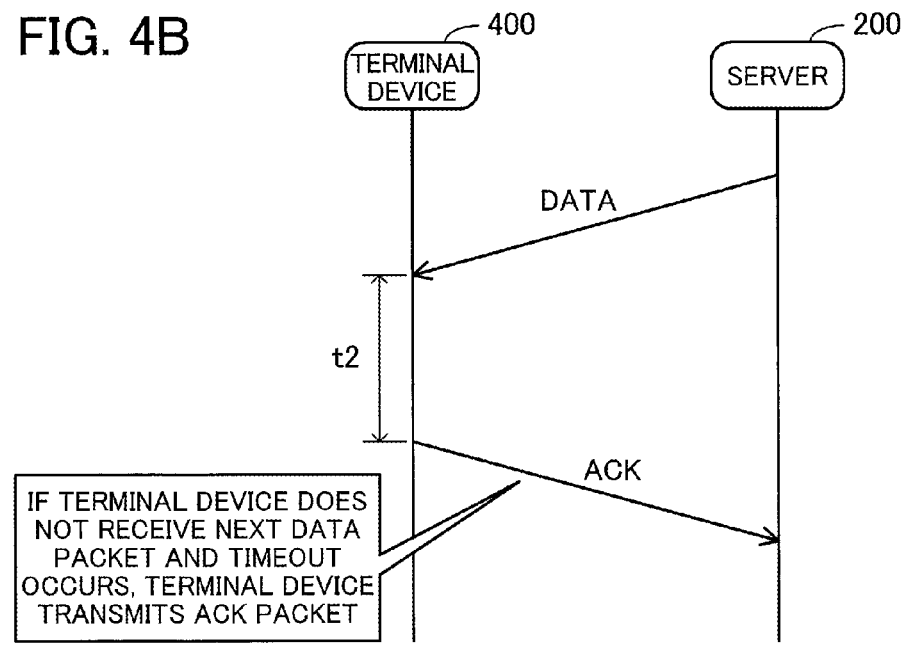

FIGS. 4A and 4B illustrate examples in which delayed ACK packets are used. FIG. 4A illustrates an example in which the terminal device 400 transmits a single ACK packet in response to a plurality of DATA packets. More specifically, FIG. 4A illustrates an example in which the terminal device 400 transmits a single ACK packet in response to two DATA packets. The server 200 sequentially transmits two DATA packets to the terminal device 400, and the terminal device 400 sequentially receives the two DATA packets. When receiving the second DATA packet, the terminal device 400 transmits an ACK packet to the server 200. In this case, the difference between the time at which the terminal device 400 receives the first DATA packet and the time at which the terminal device 400 receives the second DATA packet corresponds to a delay t1 at the terminal device 400.

FIG. 4B illustrates an example in which the terminal device 400 transmits a single ACK packet after detecting a timeout. The server 200 transmits a single DATA packet to the terminal device 400, and the terminal device 400 receives the single DATA packet. In the example in FIG. 4B, after receiving the single DATA packet, the terminal device 400 detects that a timeout period has elapsed before receiving the second DATA packet. Consequently, the terminal device 400 transmits an ACK packet to the server 200. In this case, the timeout period corresponds to a delay t2 at the terminal device 400. If the measuring device 100 calculates an RTT by extracting an ACK packet transmitted in response to a single DATA packet, the delay t2 is reflected on the RTT calculation result.

The delay t2 is attributable to the standby time of the terminal device 400 and is not related to the transmission paths (including switches) on the networks 10 and 20. Thus, the RTT measured by using the ACK packet in FIG. 4B is not appropriate to be used for monitoring the network.

While the terminal device 400 has been described with FIGS. 4A and 4B, the same applies to the terminal device 300. As in the case of the terminal device 400, if a device is connected to a wired network and is able to perform communication at a relatively high speed, delayed ACK packets are mainly used. Thus, for the communication between the server 200 and the terminal device 400, for example, the method discussed in Japanese Laid-open Patent Publication No. 2009-303089 may be used, and an RTT may be calculated by extracting the second DATA packet and the ACK packet in FIG. 4A. In this way, the RTT is not affected by the delayed ACK packet transmitted by a timeout in FIG. 4B.

However, a terminal that performs wireless communication (for example, the terminal device 300) sometimes uses delayed ACK packets for a single connection of communication, and at other times, it doesn't. Thus, if the method discussed in Japanese Laid-open Patent Publication No. 2009-303089 is used to measure RTTs for the communication between the server 200 and the terminal device 300, the opportunities of RTT measurements could be reduced. More specifically, there could be a period in which RTTs cannot be measured or the sample number of measured RTTs could be reduced. As a result, there could be a period in which the communication cannot be monitored or the RTT measurement accuracy could be deteriorated. This will be described in more detail below.

Figure 5A:
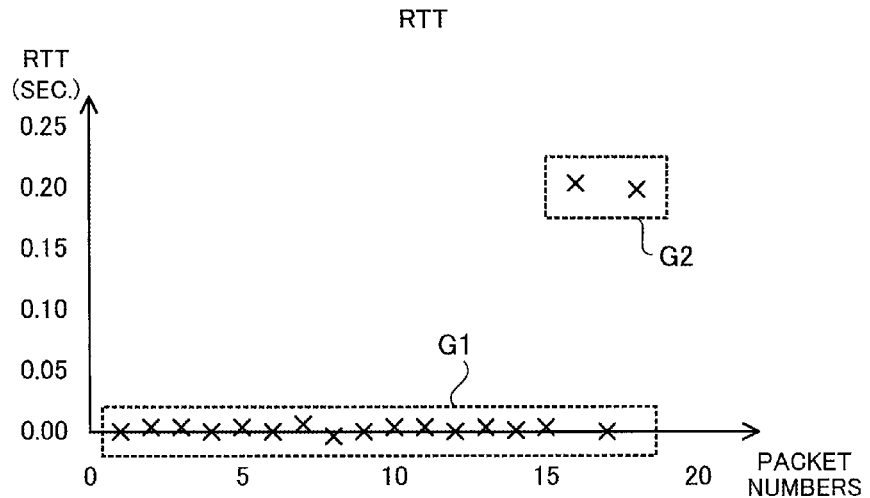
FIGS. 5A and 5B illustrate examples of measured RTTs.
Figure 5B:
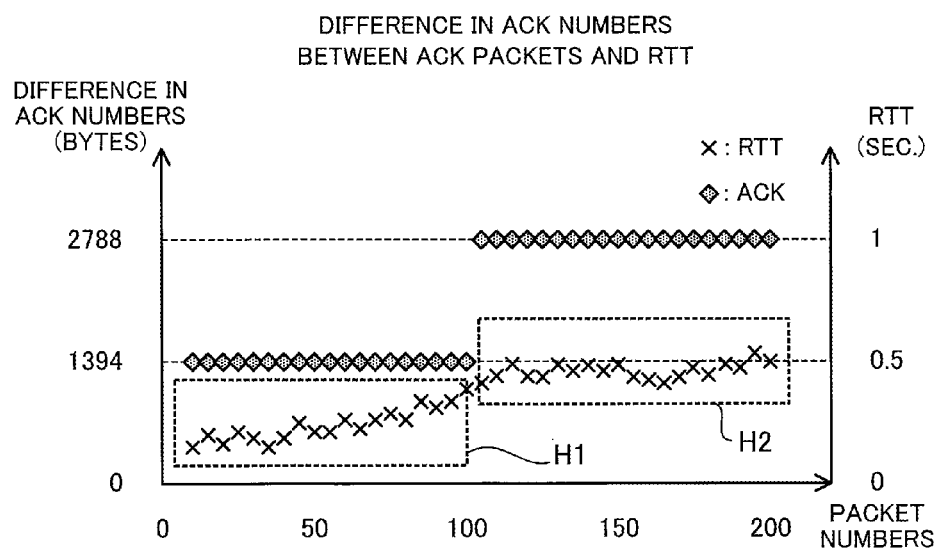

FIGS. 5A and 5B illustrate examples of measured RTTs. FIGS. 5A and 5B illustrate examples of measured RTTs regarding the communication between the server 200 and the terminal device 300. FIG. 5A illustrates examples of RTT calculation results each obtained by simply using an ACK packet transmitted in response to a single DATA packet. The measuring device 100 can calculate a single RTT by using the reception time of a single ACK packet and the reception time of a DATA packet corresponding to the ACK packet.

In FIG. 5A, the horizontal axis represents packet numbers. The packet numbers indicate the order of the ACK packets received by the measuring device 100 from the terminal device 300. The packet numbers can be deemed as time. An ACK packet having a smaller packet number signifies that this ACK packet has been transmitted earlier than an ACK packet having a larger packet number. In FIG. 5A, the vertical axis represents RTTs (seconds).

For example, among the RTT calculation results, calculation results G1 are obtained by using the delayed ACK packets that have not been transmitted by a timeout. In contrast, among the RTT calculation results, calculation results G2 are obtained by using the delayed ACK packets that have been transmitted by a timeout. Since each of the calculation results G2 is obtained by using a delayed ACK packet that has been transmitted by a timeout, the values of the RTTs calculated are larger than those of the calculation results G1.

FIG. 5B illustrates an example of a relationship between the difference in ACK number between groups of ACK packets transmitted by the terminal device 300 and the measured RTTs. In FIG. 5B, the horizontal axis represents packet numbers, and the vertical axis represents the difference (bytes) in ACK number and the RTTs (seconds).

When the terminal device 300 sequentially transmits two ACK packets, there is a difference in ACK number between the two ACK packets. The difference in ACK number corresponds to the size of the data transmitted from the server 200 between the ACK packet that has arrived first and the ACK packet that has arrived second (the sum of the TCP payload sizes).

For example, the MSS of a single DATA packet transmitted by the server 200 is 1394 bytes. In this case, if the difference in ACK number is 1394 bytes, between two ACK packets, the ACK packet that arrives second is considered to be an ACK packet transmitted in response to a single DATA packet. In addition, for example, if the difference in ACK number is 2788 bytes (1394 bytes×2), the packet that has arrived second is considered to be an ACK packet transmitted in response to two DATA packets.

Referring to FIG. 5B, the difference in ACK number differs between the period including a series H1 of RTTs and the period including a series H2 of RTTs. More specifically, in the period including the series H1, the difference in ACK number is 1394 bytes, and in the period including the series H2, the difference in ACK number is 2788 bytes. Namely, regarding the ACK packet transmission control performed by the terminal device 300, there are a period in which the terminal device 300 transmits an ACK packet in response to a single DATA packet and a period in which the terminal device 300 transmits an ACK packet in response to two DATA packets (a period in which the terminal device 300 transmits a delayed ACK).

Thus, as described above, if the method discussed in Japanese Laid-open Patent Publication No. 2009-303089 is used to measure RTTs for the communication between the server 200 and the terminal device 300, there could be a period in which the measuring device 100 cannot measure RTTs (the period including the series H1). Namely, the RTTs indicated by the series H1 could not be measured. In addition, the sample number of measured RTTs could be reduced, and the RTT measurement accuracy could be deteriorated.

If a timeout value for a delayed ACK packet is fixed, an RTT (corrected RTT) can be calculated by excluding the timeout value from an RTT calculated by using an ACK packet including delay caused on the basis of the timeout value. However, since the timeout value can vary (for example, the timeout value could vary depending on a software program such as the operating system (OS)), it is not easy to calculate RTTs while excluding the impact caused by a timeout.

Thus, the measuring device 100 provides a function with which RTTs for the communication between the server 200 and the terminal device 300 are calculated in more detail.

Figure 6:
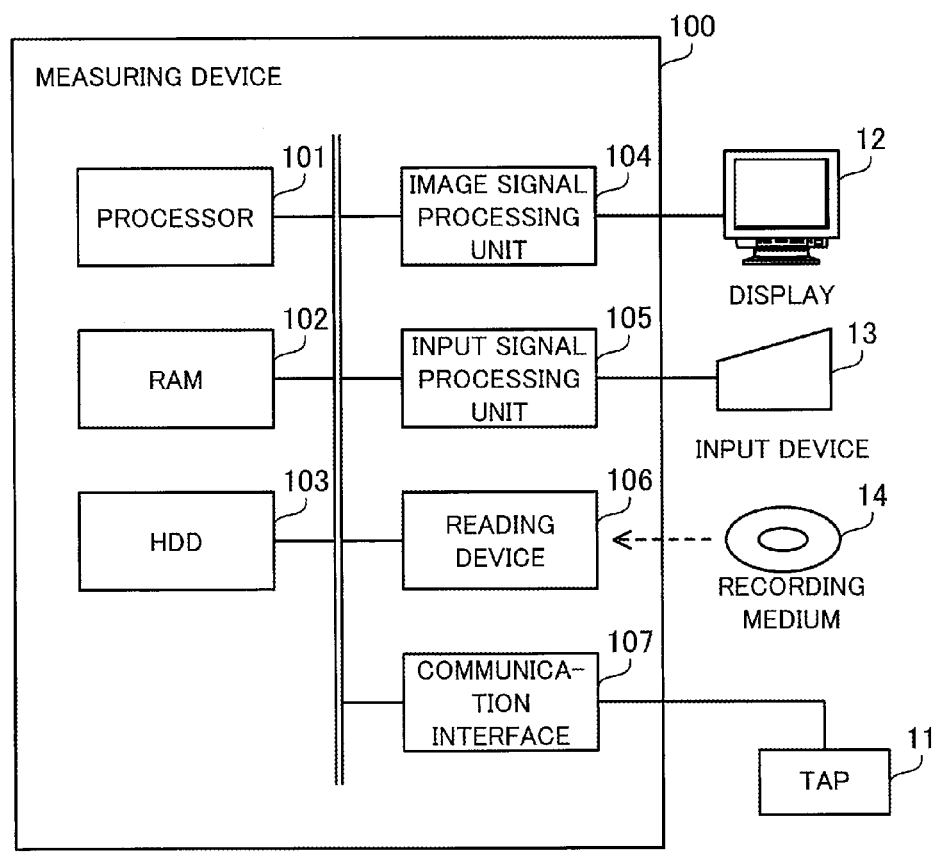
FIG. 6 illustrates an example of a hardware configuration of a measuring device.

FIG. 6 illustrates an example of a hardware configuration of the measuring device 100. The measuring device 100 includes a processor 101, a RAM 102, an HDD 103, an image signal processing unit 104, an input signal processing unit 105, a reading device 106, and a communication interface 107. Each of the units is connected to a bus in the measuring device 100.

The processor 101 controls information processing of the measuring device 100. The processor 101 may be a multiprocessor. For example, the processor 101 is a CPU, a DSP, an ASIC, or an FPGA. The processor 101 may be a combination of two or more of a CPU, a DSP, an ASIC, an FPGA, and the like.

The RAM 102 is a main storage device of the measuring device 100. The RAM 102 temporarily holds at least a part of an OS program or an application program executed by the processor 101. In addition, the RAM 102 stores various types of data used for processing by the processor 101.

The HDD 103 is an auxiliary storage device of the measuring device 100. The HDD 103 magnetically writes and reads data on its internal magnetic disk. The HDD 103 holds an OS program, an application program, and various types of data. The measuring device 100 may include another kind of auxiliary storage device such as a flash memory or a solid state drive (SSD). The measuring device 100 may include a plurality of auxiliary storage devices.

The image signal processing unit 104 outputs an image to the display 12 connected to the measuring device 100 in accordance with a command from the processor 101. Examples of the display 12 include a cathode ray tube (CRT) display and a liquid crystal display (LCD).

The input signal processing unit 105 acquires an input signal from the input device 13 connected to the measuring device 100 and outputs the input signal to the processor 101. Examples of the input device 13 includes a pointing device such as a mouse or a touch panel and a keyboard.

The reading device 106 reads a program or data recorded on the recording medium 14. Examples of the recording medium 14 include: a magnetic disk such as a flexible disk (FD) or a HDD; an optical disc such as a compact disc (CD) or a digital versatile disc (DVD); and a magneto-optical disk (MO). As the recording medium 14, for example, a nonvolatile semiconductor memory such as a flash memory card may be used. For example, the reading device 106 stores a program or data read from the recording medium 14 in the RAM 102 or the HDD 103 in accordance with a command from the processor 101.

The communication interface 107 is connected to the tap 11 via a predetermined cable. The communication interface 107 receives packets exchanged between the server 200 and the terminal device 300 and packets exchanged between the server 200 and the terminal device 400 from the tap 11.

The server 200 and the terminal devices 300 and 400 may be realized by using units equivalent to those used in the measuring device 100. FIG. 6 illustrates a configuration in which the display 12 and the input device 13 are externally connected to the measuring device 100. However, any one of the measuring device 100, the server 200, and the terminal devices 300 and 400 may include at least one of the display and the input device. In addition, as a communication interface, the terminal device 300 includes a wireless unit that communicates with the base station 30.

Figure 7:
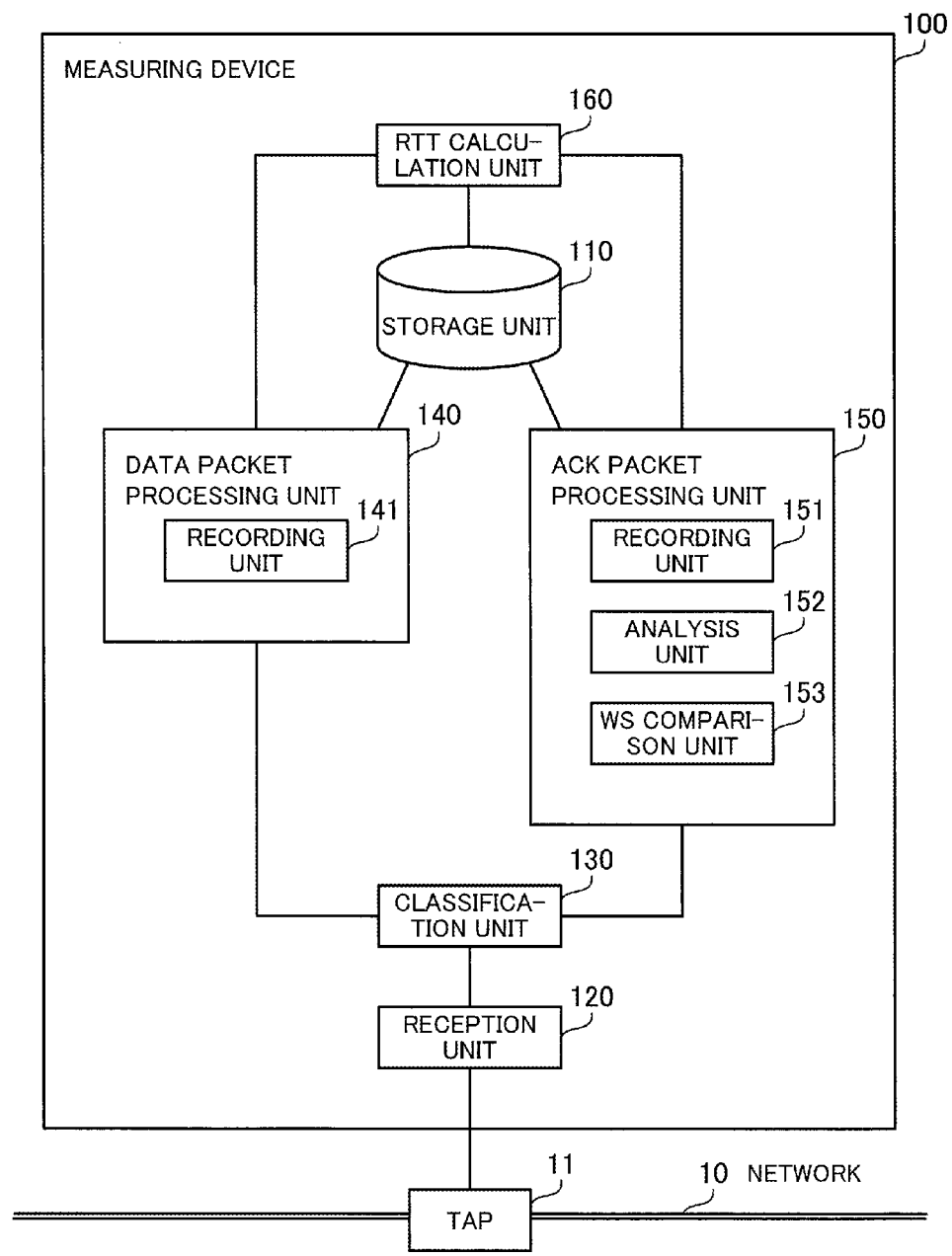
FIG. 7 illustrates an example of a software configuration of the measuring device.

FIG. 7 illustrates an example of a software configuration of the measuring device 100. The measuring device 100 includes a storage unit 110, a reception unit 120, a classification unit 130, a DATA packet processing unit 140, an ACK packet processing unit 150, and an RTT calculation unit 160. The storage unit 110 may be realized by using a storage area in the RAM 102 or the HDD 103. Each of the reception unit 120, the classification unit 130, the DATA packet processing unit 140, the ACK packet processing unit 150, and the RTT calculation unit 160 may be realized by causing the processor 101 to execute a predetermined program stored in the RAM 102.

The storage unit 110 holds information about collected packets. The storage unit 110 holds information about RTTs calculated on the basis of the collected packets.

The reception unit 120 receives packets transmitted from the tap 11. The received packets include DATA packets transmitted from the server 200 to the terminal device 300 and ACK packets transmitted from the terminal device 300 to the server 200.

The classification unit 130 classifies the packets received by the reception unit 120. More specifically, the classification unit 130 extracts packets to be analyzed on the basis of header information included in the received packets. The classification unit 130 determines a connection on the basis of a combination of source and destination IP addresses in the IP header and a combination of source and destination port numbers in the TCP header of an extracted packet. For example, information about the IP addresses of the server 200 and the terminal devices 300 and 400 that are monitored is stored in advance in the storage unit 110. In addition, information about the port numbers used by the applications that are monitored is stored in advance in the storage unit 110.

When receiving an analysis target packet, if the payload size of the TCP (which will simply be referred to as a TCP payload size, as needed) is not 0, the classification unit 130 determines that the packet is a DATA packet and requests the DATA packet processing unit 140 to process the DATA packet. If the TCP payload size is 0, the classification unit 130 determines that the packet is an ACK packet and requests the ACK packet processing unit 150 to process the ACK packet.

The DATA packet processing unit 140 processes DATA packets. The DATA packet processing unit 140 includes a recording unit 141. The recording unit 141 associates information about a DATA packet with the reception time of the DATA packet and stores the associated information in the storage unit 110. The information about the DATA packet includes the sequence number and the TCP payload size written in the DATA packet.

The ACK packet processing unit 150 processes ACK packets. The ACK packet processing unit 150 includes a recording unit 151, an analysis unit 152, and a WS comparison unit 153.

The recording unit 151 associates information about an ACK packet with the reception time of the ACK packet and stores the associated information in the storage unit 110. The information about the ACK packet includes the ACK number and the window size written in the ACK packet.

The analysis unit 152 extracts an ACK packet transmitted in response to a single DATA packet on the basis of the information about the DATA packets and ACK packets stored in the storage unit 110. The analysis unit 152 calculates the difference between the ACK number of a first ACK packet and the ACK number of a second ACK packet, which is the previous ACK packet received before the first ACK packet. When the difference matches the size of the DATA packet that corresponds to the first ACK packet, the analysis unit 152 determines that the first ACK packet is an ACK packet transmitted in response to a single DATA packet.

The WS comparison unit 153 compares a first window size of the first ACK packet transmitted in response to a single DATA packet with a second window size of the second ACK packet, which is the previous ACK packet received before the first ACK packet. On the basis of the comparison result, the WS comparison unit 153 determines whether to use the first ACK packet to calculate an RTT.

More specifically, when the first window size is equal to or more than the second window size, the WS comparison unit 153 determines to use the first ACK packet to calculate an RTT. When the first window size is less than the second window size, the WS comparison unit 153 determines not to use the first ACK packet to calculate an RTT.

The RTT calculation unit 160 uses the ACK packet, which the WS comparison unit 153 determines to use to calculate an RTT, to calculate an RTT. More specifically, the RTT calculation unit 160 calculates the difference between the reception time of the ACK packet and the reception time of a DATA packet corresponding to the ACK packet as an RTT. The RTT calculation unit 160 outputs an RTT calculation result. For example, the RTT calculation unit 160 stores information about the RTT calculation result in the storage unit 110. The RTT calculation unit 160 may cause the display 12 to display the RTT calculation result.

Figure 8B:
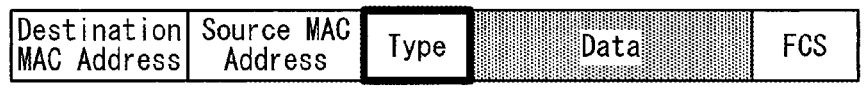
Figure 8B:
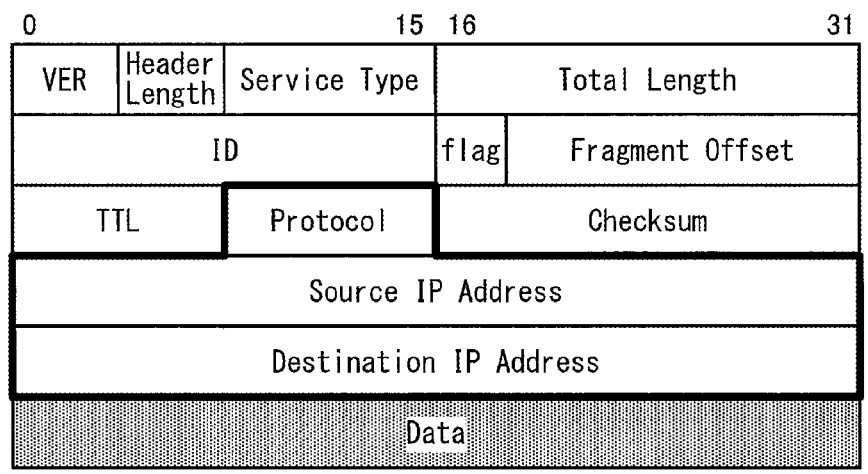
Figure 8C:
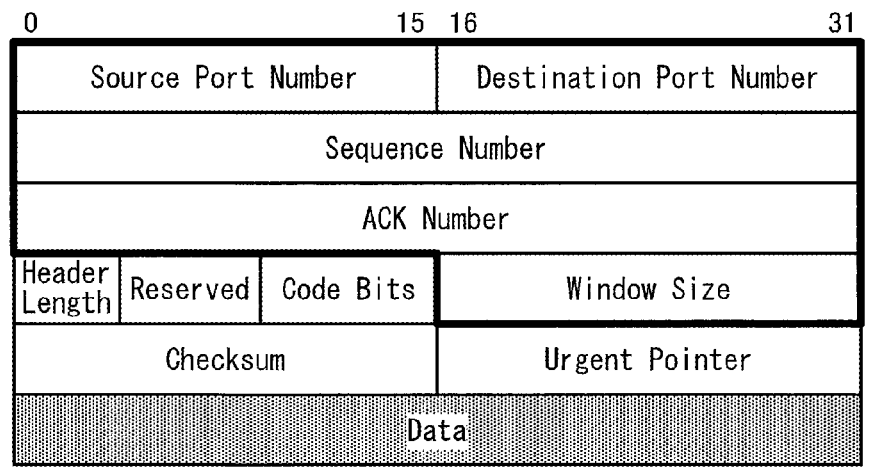

FIGS. 8A to 8C illustrate examples of an Ethernet header, an IP header, and a TCP header, respectively. When the type field of the Ethernet header in a received packet is "0800," the classification unit 130 determines that the packet corresponds to IP version 4 (IPv4). When the protocol field of the IP header is "6," the classification unit 130 determines that the packet corresponds to TCP.

In addition, the classification unit 130 classifies a connection, depending on the combination of source and destination IP addresses included in the IP header and the combination of source and destination port numbers included in the TCP header. The TCP header also includes fields in which values such as for the sequence number, the ACK number, and the window size are stored. The code bit fields of the TCP header include a field including an ACK flag indicating that a valid value is stored for an ACK number.

While FIG. 8B illustrates an example of an IPv4 header, the measuring device 100 is able to perform the following control operations, which will be described below, not only on an IPv4 header but also on an IPv6 header (for example, even in the case of an IPv6 header, the source and destination IP addresses and information identifying an upper-level protocol are included).

Next, the reason why the WS comparison unit 153 determines whether to use an ACK packet to calculate an RTT on the basis of the window sizes will be described.

Figure 9A:
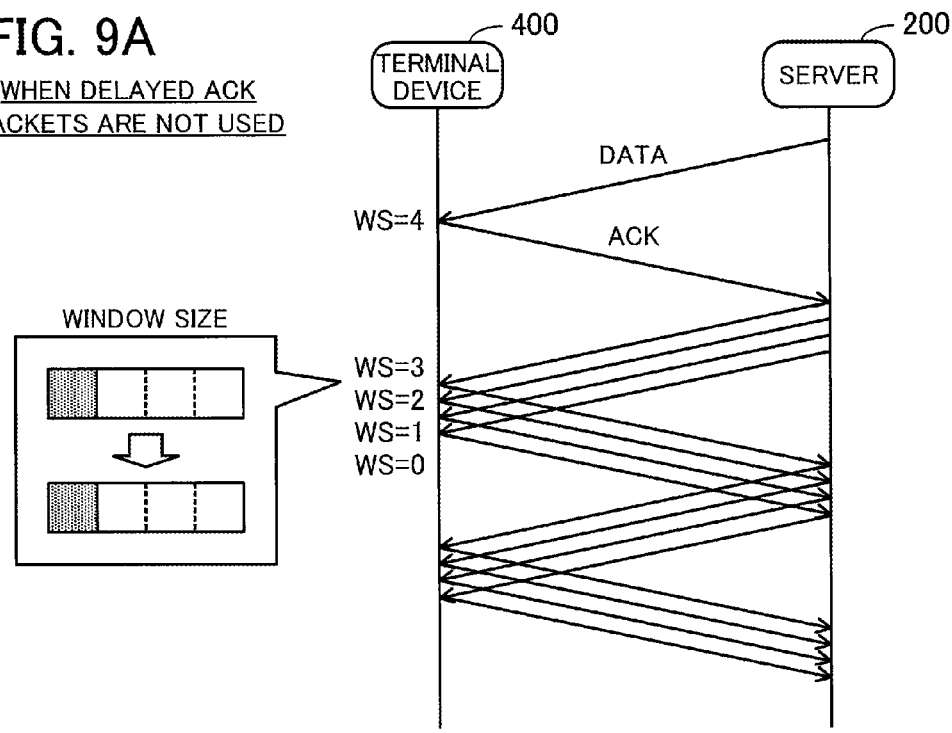
FIGS. 9A and 9B illustrate examples of a communication operation performed by a wired terminal.
Figure 9B:
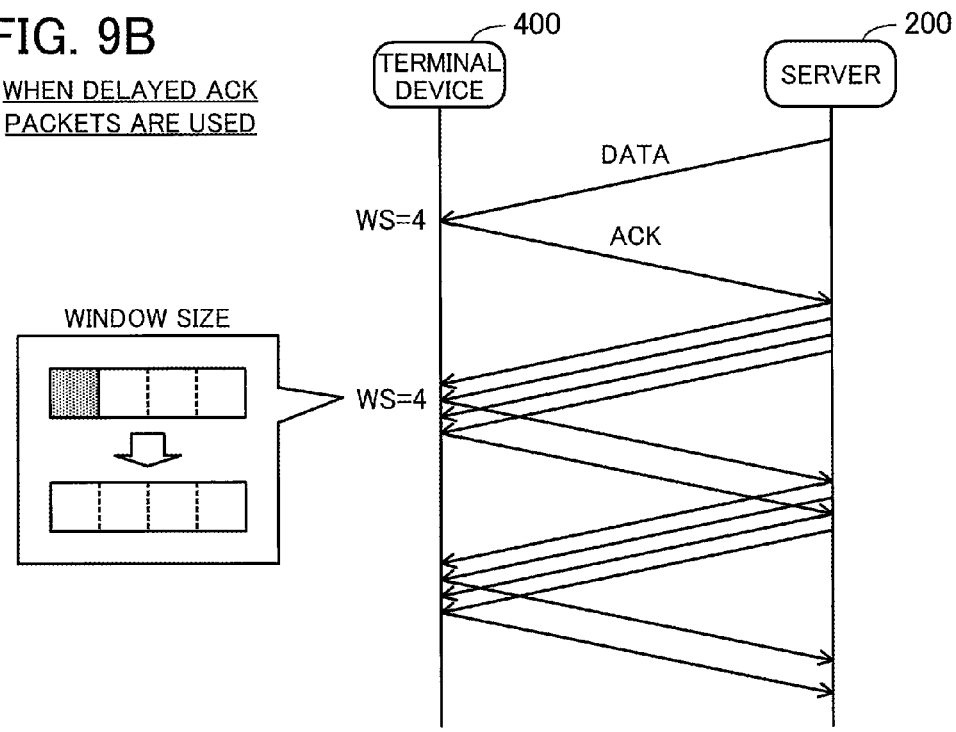

FIGS. 9A and 9B illustrate examples of a communication operation performed by a wired terminal. FIGS. 9A and 9B illustrate examples of a communication operation between the server 200 and the terminal device 400. FIG. 9A illustrates an example in which delayed ACK packets are not used, and FIG. 9B illustrates an example in which delayed ACK packets are used. As described with reference to FIG. 3, wired transmission paths enable faster communication than wireless transmission paths, and a relatively large window size is used from the start of a communication. Thus, when delayed ACK packets are not used, data processing cannot promptly be performed, and the window size of which the terminal device 400 notifies the server 200 could be reduced (FIG. 9A). FIG. 9A illustrates an example in which the window size (WS) is gradually reduced from 4 to 0.

Thus, if the terminal device 400 uses delayed ACK packets, the chance that the terminal device 400 transmits an ACK packet after performing data processing is increased. As a result, the reduction of the window size of which the terminal device 400 notifies the server 200 is prevented (FIG. 9B). FIG. 9B illustrates an example in which a single ACK packet is transmitted in response to two DATA packets. In this way, the window size (WS) is maintained 4.

Thus, in the case of the communication between the server 200 and the terminal device 400, using delayed ACK packets achieves better efficiency than transmitting ACK packets each of which is in response to a single DATA packet.

Figure 10A:
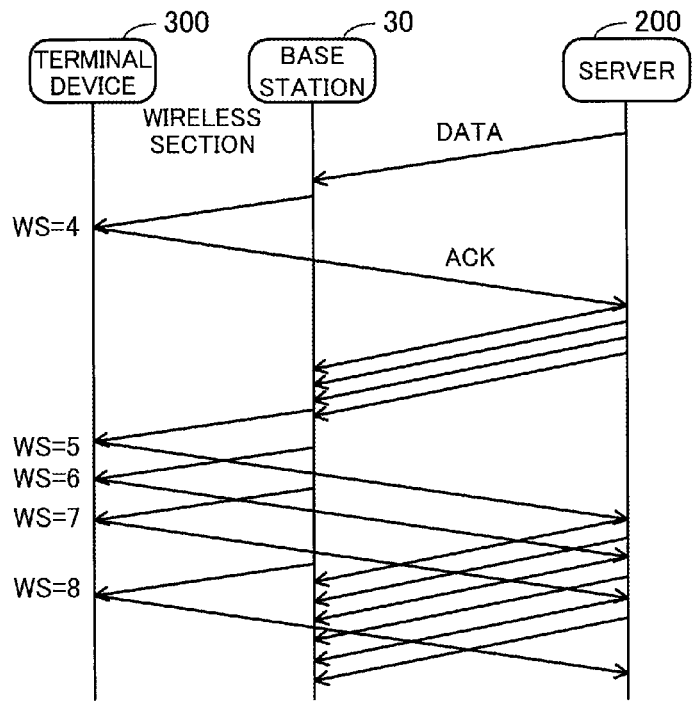
FIGS. 10A and 10B illustrate examples of a communication operation performed by a wireless terminal.
Figure 10B:
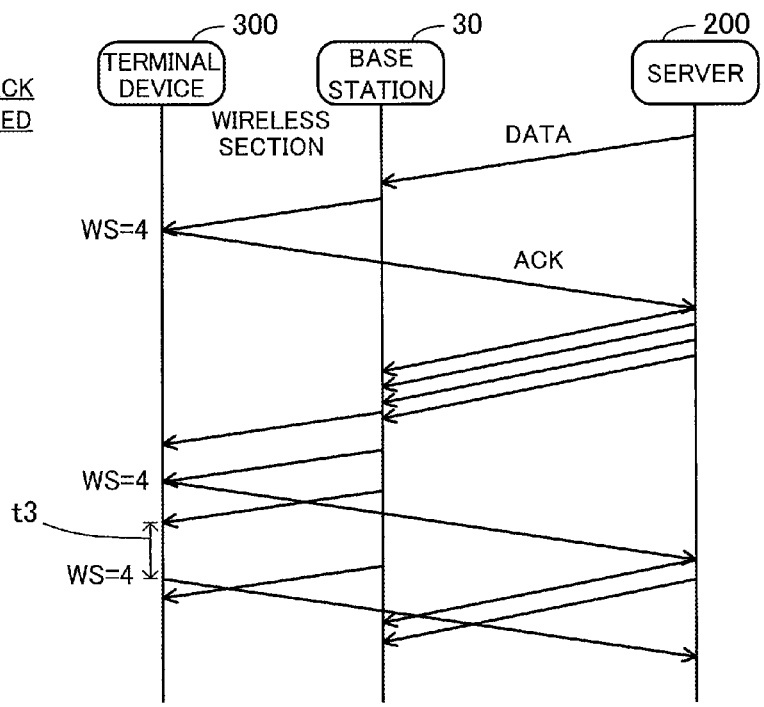

FIGS. 10A and 10B illustrate examples of a communication operation performed by a wireless terminal. FIGS. 10A and 10B illustrate examples of a communication operation between the server 200 and the terminal device 300. FIG. 10A illustrates an example in which delayed ACK packets are not used. FIG. 10B illustrates an example in which delayed ACK packets are used. For example, depending on the OS executed in the terminal device 300, there are cases in which the terminal device 300 uses a small window size when a communication is started and increases the window size gradually. A communication in a wireless section could be slower and less stable than that in a wired section. Thus, by starting the communication relatively slowly, the terminal device 300 prevents the server 200 to transmit DATA packets more than the communication amount that can be used in the wireless section. In addition, the communication speed of a communication in a wireless section is lower than that in a wired section, and the difference between the time at which a DATA packet arrives at the terminal device 300 and the time at which another DATA packet arrives at the terminal device 300 is larger than the difference between the time at which the DATA packet arrives at the base station 30 and the time at which the another DATA packet arrives at the base station 30. Thus, if the terminal device 300 uses a delayed ACK packet when the window size is relatively small (even when terminal device 300 can increase the window size), if the terminal device 300 waits for the next data packet until a timeout, and if the delay is accordingly increased, the network utilization efficiency could be deteriorated conversely (FIG. 10B). In FIG. 10B, a time t3 indicates the delay caused by a timeout.

Thus, when the window size can be increased, it is conceivable that transmitting an ACK packet in response to a single DATA packet achieves better network utilization efficiency, compared with using a delayed ACK packet. Based on such grounds, there are cases in which, when the terminal device 300 can increase the window size, the terminal device 300 transmits a single ACK packet in response to a single data packet, instead of using a delayed ACK packets (FIG. 10A). FIG. 10A illustrates an example in which the terminal device 300 transmits an ACK packet to the server 200 each time the terminal device 300 receives a DATA packet and in which the terminal device 300 gradually increases the window size (WS) from 4 to 8.

Figure 11:
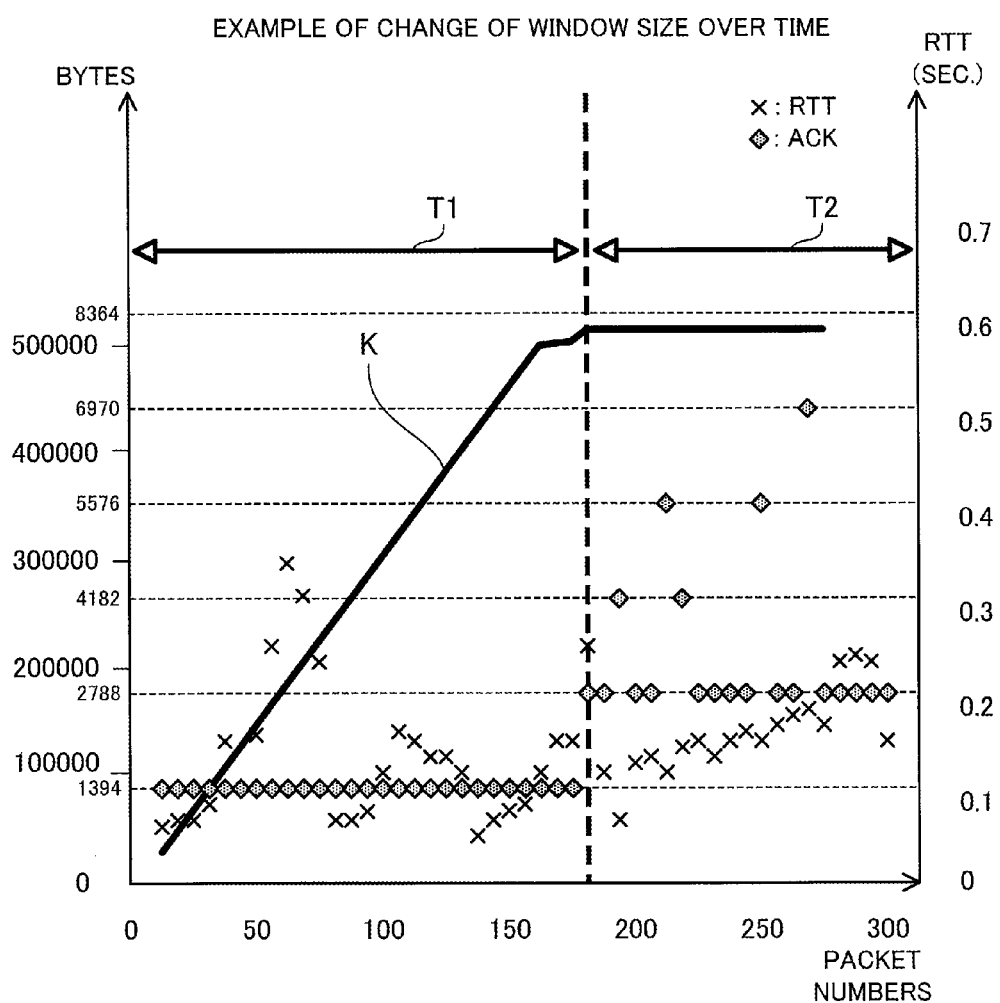
FIG. 11 illustrates an example of change of the window size over time.

FIG. 11 illustrates an example of change of the window size over time. A line K represents change of the window size of which the terminal device 300 notifies the server 200 over time. The horizontal axis represents the packet numbers (which can be deemed as time, as described above). The vertical axis with respect to the line K represents bytes (the line K is represented by a scale including 100000, 200000, 300000, 400000, and 500000). A period T1 is a period in which delayed ACK packets are not used, and a period T2 that follows the period T1 is a period in which delayed ACK packets are used.

The graph in FIG. 11 also illustrates, as examples, RTTs each measured on the basis of an ACK packet and the difference between the ACK number of an ACK packet and the ACK number of the previous ACK packet. The right vertical axis represents the RTTs measured in seconds. The left vertical axis represents the difference in ACK number in bytes (the difference in ACK number is represented by a scale including 1394, 2788, 4182, 5576, 6970, and 8364).

As indicated by the like K, it is seen that the terminal device 300 has a feature that, when the terminal device 300 transmits ACK packets in the period T1 in which the terminal device 300 transmits an ACK packet in response to a single DATA packet without using a delayed ACK packet, the terminal device 300 gradually increases the window size. In the period T2 in which the terminal device 300 uses delayed ACK packets, there is almost no change in the window size.

By using this feature of the terminal device 300 regarding control of ACK packets in the period T1, among the ACK packets each of which has been transmitted in response to a DATA packet, the measuring device 100 extracts ACK packets other than those corresponding to delayed ACK packets.

FIG. 12 illustrates an example of a part of a packet table 111. The packet table 111 includes information about the packets collected by the measuring device 100. The packet table 111 is stored in the storage unit 110. The packet table 111 includes columns for "No.," "TIME," "Source Address (SA)," "Source Port (SP)," "Destination Address (DA)," "Destination Port (DP)," "Protocol," "TCP Length (LEN)," "IP LEN," "sequence (seq)," "next seq," "ack," "RTT," and "WS."

Hereinafter, a record in the packet table 111 will be described. In the box under "No.," a number identifying this record is registered. In the box under "TIME," the time at which the packet corresponding to the record is received is registered. For example, in the box under "TIME," information representing the year, month, date, hour, minute, and second may be registered. In the box under "SA," the corresponding source IP address is registered. In the box under "SP," the corresponding source port number is registered. In the box under "DA," the corresponding destination IP address is registered. In the box under "DP," the corresponding destination port number is registered. In the box under "Protocol," the corresponding protocol type (for example, TCP) is registered. In the box under "TCP LEN," the corresponding TCP payload size is registered. In the box under "IP LEN," the corresponding IP packet size is registered. In the box under "seq," the corresponding sequence number is registered. In the box under "next seq," the corresponding next sequence number is registered. The next sequence number is a value obtained by adding the TCP payload size to the sequence number. In the box under "ack," the corresponding ACK number is register. In the box under "RTT," the corresponding RTT calculation result is registered. In the box under "WS," the corresponding window size is registered. In the packet table 111, a box in which no information is set is indicated by a hyphen "-".

In the packet table 111, IP addresses "IP1" and "IP2" are the IP addresses of the server 200 and the terminal device 300, respectively. A port number "a" is the number of a port used by the server 200 when the server 200 communicates with the terminal device 300. A port number "b" is the number of a port used by the terminal device 300 when the terminal device 300 communicates with the server 200.

For example, in the packet table 111, there is a record including "9" under "No.," "13:20:01.317465" under "TIME," "IP1" under "SA," "a" under "SP," "IP2" under "DA," "b" under "DP," "TCP" under "Protocol," "1394" under "TCP LEN," "1434" under "IP LEN," "4183" under "seq," "5577" under "next seq," "479" under "ack," "-" under "RTT," and "15744" under "WS." This record includes information about a DATA packet transmitted from the server 200 to the terminal device 300.

In addition, in the packet table 111, there is a record including "12" under "No.," "13:20:01.314492" under "TIME," "IP2" under "SA," "b" under "SP," "IP1" under "DA," "a" under "DP," "TCP" under "Protocol," "0" under "TCP LEN," "40" under "IP LEN," "479" under "seq," "-" under "next seq," "1395" under "ack," "0.05354" under "RTT," and "17536" under "WS." This record includes information about an ACK packet transmitted from the terminal device 300 to the server 200.

FIG. 13 illustrates an example of another part of the packet table 111. In this way, the recording units 141 and 151 store information about the DATA packets and the ACK packets in the packet table 111. In the following description, as needed, a packet indicated by a record including No. "X" (X is any number) in the packet table 111 will simply be referred to as the packet of No. X.

For example, the DATA packet of No. 15 corresponds to the ACK packet of No. 32. This is because the ACK number "11153" of the ACK packet of No. 32 matches the next sequence number "11153" of the DATA packet of No. 15 (=the sequence number "9759"+the TCP payload size "1394" of the DATA packet).

In addition, it is seen that the ACK packet of No. 32 has been transmitted in response to the single DATA packet of No. 15. This is because the difference "11153−9759=1394" between the ACK number "11153" of the ACK packet of No. 32 and the ACK number "9759" of the ACK packet of No. 30 immediately before the ACK packet of No. 32 is received matches the TCP payload size "1394" of the DATA packet of No. 15.

Likewise, the measuring device 100 is able to determine whether an ACK packet has been transmitted in response to a plurality of DATA packets. Specifically, if the difference between the ACK number of the target ACK packet and the ACK number of the previous ACK packet before the target ACK packet matches the sum of TCP payload sizes of a plurality of DATA packets received after the DATA packet corresponding to the previous ACK packet, the target ACK packet is determined to have been transmitted in response to a plurality of DATA packets. More specifically, assuming that the TCP payload size of each of a series of DATA packets is "1394," the difference between the ACK number of the target ACK packet and the ACK number of the previous ACK packet is "1394"×N (N is an integer of 2 or more), the target ACK packet is determined to have been transmitted in response to N DATA packets as a delayed ACK packet.

In addition, it is seen from the packet table 111 that the window size "38016" of the ACK packet of No. 32 is larger than the window size "35072" of the previous ACK packet of No. 30.

FIG. 14 illustrates an output example. For example, the RTT calculation unit 160 focuses on one connection, calculates an average value of RTTs measured for one minute, and outputs the average value as an RTT measurement result. The RTT calculation unit 160 may cause the display 12 to display the content illustrated in FIG. 14. In the output example in FIG. 14, a line number is given on the left side of each line.

For example, line 1 indicates the output time "2013/7/16 13:21:00." Line 2 indicates the IP address "IP1" of the server 200. Line 3 indicates the port number "a" used by the server 200 when the server 200 communicates with the terminal device 300. Line 4 indicates the IP address "IP2" of the terminal device 300. Line 5 indicates the port number "b" used by the terminal device 300 when the terminal device 300 communicates with the server 200. Line 6 indicates the start time of the communication "2013/7/16 13:20:00." Line 7 indicates the end time of the communication "2013/7/16 13:20:59." It is seen from this output example in FIG. 14 that RTT measurements were performed for one minute from 13:20:00 to 13:20:59 on Jul. 16, 2013.

Line 8 indicates the number "221" of RTT measurements relating to the DATA packets transmitted from the server 200 to the terminal device 300. Line 9 indicates the RTT average value "118387" relating to the DATA packets transmitted from the server 200 to the terminal device 300. In the output example in FIG. 14, the unit of the RTTs is microsecond. Line 10 indicates the standard deviation "50202" of the RTTs transmitted from the server 200 to the terminal device 300. Line 11 indicates the minimum value "37070" of the RTTs transmitted from the server 200 to the terminal device 300. Line 12 indicates the maximum value "254796" of the RTTs transmitted from the server 200 to the terminal device 300.

Line 13 indicates the number "2" of RTT measurements relating to the DATA packets transmitted from the terminal device 300 to the server 200. Line 14 indicates the RTT average value "34" relating to the DATA packets transmitted from the terminal device 300 to the server 200. Line 15 indicates the standard deviation "2" of the RTTs relating to the DATA packets transmitted from the terminal device 300 to the server 200. Line 16 indicates the minimum value "32" of the RTTs relating to the DATA packets transmitted from the terminal device 300 to the server 200. Line 17 indicates the maximum value "36" of the RTTs relating to the DATA packets transmitted from the terminal device 300 to the server 200.

While FIG. 14 illustrates an example in which the average of a plurality of RTTs measured for one minute is output as an RTT measurement result, the user may set any time length to calculate the average. For example, the user may set another time such as 5 or 10 minutes to cause the RTT calculation unit 160 to calculate the average of a plurality of RTTs measured for the set time length. In this case, the RTT calculation unit 160 may output the calculated average as an RTT measurement result. The RTT calculation unit 160 may output an RTT for each ACK packet. The RTT calculation unit 160 may output the average of a plurality of RTTs obtained by performing a predetermined number of measurements as an RTT measurement result.

Next, a procedure of RTT measurement processing performed by the measuring device 100 will be described.

Figure 15:
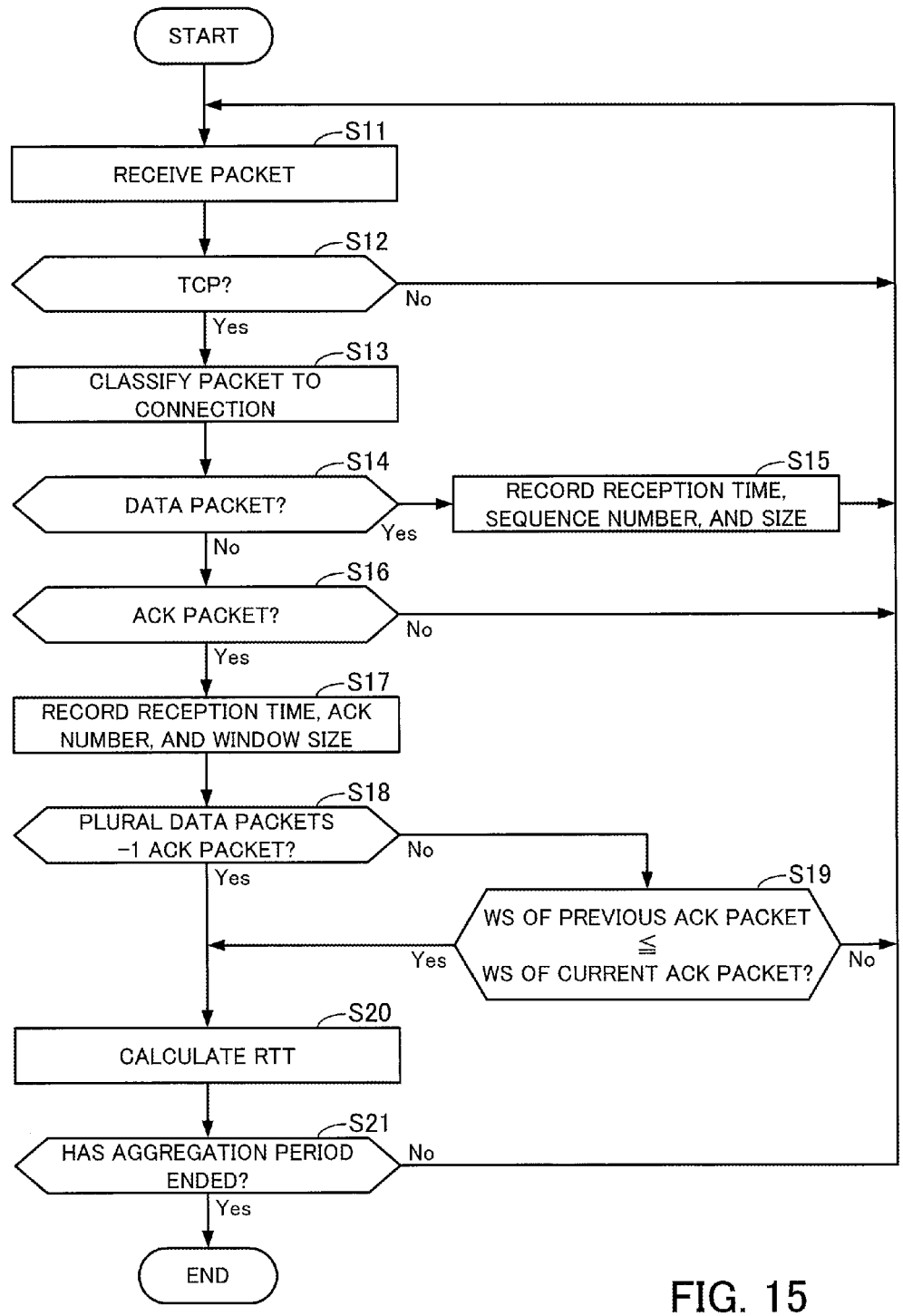
FIG. 15 is a flowchart illustrating an example of an RTT measurement procedure.

FIG. 15 is a flowchart illustrating an example of RTT measurement processing. Hereinafter, the processing illustrated in FIG. 15 will be described step by step.

(S11) The reception unit 120 receives a packet from the tap 11.

(S12) The classification unit 130 refers to the protocol field of the IP header included in the received packet and determines whether the protocol type of the received packet is TCP. If the protocol type is TCP, the processing proceeds to step S13. If not, the processing returns to step S11 (the classification unit 130 may drop the received packet). If the protocol field of the IP header represents "6," the classification unit 130 determines that the protocol type is TCP.

(S13) The classification unit 130 classifies the received packet into a connection. More specifically, if a combination of source and destination IP addresses and a combination of source and destination port numbers of a packet are the same as those of another packet, these packets are determined to belong to the same connection.

(S14) The classification unit 130 determines whether the received packet is a DATA packet. If the received packet is a DATA packet, the processing proceeds to step S15. If not, the processing proceeds to step S16. More specifically, if the TCP payload size of the received packet is not 0, the classification unit 130 determines that the received packet is a DATA packet.

(S15) The recording unit 141 records information about the received DATA packet in the packet table 111. As described above, information about the reception time, the sequence number, the TCP payload size, etc. of the DATA packet is recorded. Next, the processing returns to step S11.

(S16) The classification unit 130 determines whether the received packet is an ACK packet. If the received packet is an ACK packet, the processing proceeds to step S17. If not, the processing returns to step S11 (the classification unit 130 may drop the received packet). For example, when the ACK flag of the TCP header of the packet is on and when the TCP payload size of the packet is 0, the classification unit 130 determines that the packet is an ACK packet.

(S17) The recording unit 151 records information about the received ACK packet in the packet table 111. As described above, information about the reception time, the ACK number, and the window size of the ACK packet is recorded. Next, the processing proceeds to step S18. The recording units 141 and 151 may create a packet table for each of the connections, into one of which the classification unit 130 has classified the received packet in step S13.

(S18) The analysis unit 152 determines whether the received ACK packet is a delayed ACK packet that has been transmitted in response to a plurality of DATA packets (plural DATA packets–1 ACK packet). If so, the processing proceeds to step S20. If not, namely, if the received ACK packet has been transmitted in response to a single DATA packet (1 DATA packet–1 ACK packet), the processing proceeds to step S19. The analysis unit 152 performs the determination in step S18 on the basis of the information recorded in the packet table 111 as illustrated in FIG. 13. More specifically, the analysis unit 152 compares the difference between the ACK number of the received ACK packet and the ACK number of the previous ACK packet with the TCP payload size of a DATA packet received between the two ACK packets. If the difference between the ACK numbers matches the TCP payload size, the analysis unit 152 determines that the received ACK packet has been transmitted in response to a single DATA packet (1 DATA packet–1 ACK packet). If the difference between the ACK numbers is N times of the TCP payload size (N is an integer of 2 or more), the analysis unit 152 determines that the received ACK packet has been transmitted in response to a plurality of DATA packets (plural DATA packets–1 ACK packet).

(S19) The WS comparison unit 153 determines whether the window size (WS) of the received ACK packet (the current ACK packet) is equal to or more than the window size (WS) of the previous ACK packet. If so, the WS comparison unit 153 determines to use the received ACK packet to calculate an RTT, and the processing proceeds to step S20. If not, the WS comparison unit 153 determines not to use the received ACK packet to calculate an RTT, and the processing returns to step S11. The WS comparison unit 153 performs the determination in step S19 by comparing the window size of the received ACK packet with the window size of the previous ACK packet. The window sizes are recorded in the packet table 111 as illustrated in FIG. 13.

(S20) The RTT calculation unit 160 calculates an RTT by using the received ACK packet. In step S18, if the analysis unit 152 determines whether the received ACK packet is a delayed ACK packet that has been transmitted in response to a plurality of DATA packets, the RTT calculation unit 160 determines the difference between the reception time of the last DATA packet among the plurality of DATA packets and the reception time of the received ACK packet to be an RTT. Regarding this method, for example, the above Japanese Laid-open Patent Publication No. 2009-303089 may be used as a reference. For example, in the case of a single ACK packet transmitted in response to two DATA packets (2 DATA packets–1 ACK packet), the RTT calculation unit 160 determines the difference between the reception time of the second DATA packet and the reception time of the ACK packet to be an RTT. In steps S18 and S19, if the received ACK packet has been transmitted in response to a single DATA packet (1 DATA packet–1 ACK packet) and if the window size of the received ACK packet is equal to or more than the window size of the previous ACK packet, the RTT calculation unit 160 determines the difference between the reception time of the received ACK packet and the reception time of the DATA packet corresponding to the ACK packet to be an RTT. The RTT calculation unit 160 associates the calculated RTT with the reception time of the received ACK packet RTT and registers the associated information in the packet table 111 (the value of the measured RTT is registered in the record corresponding to the received ACK packet). The RTT calculation unit 160 may output the RTT calculated by using the received ACK packet to the display 12. Namely, the RTT calculation unit 160 may present the calculated RTT to the user by causing the display 12 to display the RTT.

(S21) The RTT calculation unit 160 determines whether an RTT aggregation period has ended. If so, the processing proceeds to END. If not, the processing returns to step S11. The RTT calculation unit 160 outputs an RTT measurement result obtained during the aggregation period on the basis of the RTTs recorded in the packet table 111. For example, the RTT calculation unit 160 may measure a plurality of RTTs for one minute and output the average of the RTTs per minute as a measurement result. In this case, for example, if the RTT calculation unit 160 measures a plurality of RTTs for five minute, the RTT calculation unit 160 outputs five RTT averages, from the first one minute to the fifth one minute, as measurement results. The RTT calculation unit 160 may output the content illustrated as an example in FIG. 14 to the storage unit 110 as data to which the user can refer by using a certain application. The RTT calculation unit 160 may output the content to the display 12 and cause the display 12 to display the content.

The measuring device 100 may start the procedure in FIG. 15 when receiving a user instruction for starting the RTT measurement processing. In this case, along with the instruction, the measuring device 100 may receive information specifying a monitoring target connection. In this case, in step S20, the RTT calculation unit 160 calculates RTTs for the specified connection. In addition, in step S21, the RTT calculation unit 160 may determine that the RTT aggregation period ends when the specified connection ends.

In addition, in step S19, the RTT calculation unit 160 may determine to calculate an RTT by using the current ACK packet when the window size (the current WS) of the current ACK packet is larger than the window size (the previous WS) of the previous ACK packet and may determine not to calculate an RTT when the window size (the current WS) is equal to or less than the previous WS.

FIG. 16 illustrates examples of RTT measurement results. While FIGS. 12 and 13 illustrate the packet table 111 in which the RTT calculation results are registered, FIG. 16 illustrates a packet table 111a created by extracting the records of the ACK packets used for RTT calculation from the packet table 111. In addition, the packet table 111a additionally includes a column "ACK difference." In each box under "ACK difference," the difference from the ACK number of the corresponding previous ACK packet is indicated.

For example, referring to the record corresponding the ACK packet of No. 30, information indicating "0.03978" seconds is registered in the corresponding box under "RTT." This is the difference between the reception time "13:20:01.314598" of the DATA packet of No. 14 and the reception time "13:20:01.354380" of the ACK packet of No. 30 in the packet table 111. The box under "RTT" indicates a result obtained by rounding off the RTT to the five decimal places (the same applies to the following).

Referring to the record corresponding to the ACK packet of No. 32, information indicating "0.04877" seconds is registered in the corresponding box under "RTT." This is the difference between the reception time "13:20:01.314612" of the DATA packet of No. 15 and the reception time "13:20:01.363385" of the ACK packet of No. 32 in the packet table 111.

Referring to the record corresponding to the ACK packet of No. 33, information indicating "0.04879" seconds is registered in the corresponding box under "RTT." This is the difference between the reception time "13:20:01.314618" of the DATA packet of No. 16 and the reception time "13:20:01.363403" of the ACK packet of No. 33 in the packet table 111.

Regarding the records corresponding to the relevant ACK packets up to No. 44 other than the above ACK packets, the respective RTT values are also registered. In the packet table 111a, the ACK difference of each of all the records corresponding to the ACK packets of No. 23, 24, 30, . . . , and 44 is "1394." The ACK difference "1394" matches the TCP payload size×1 of a DATA packet. Thus, each of the ACK packets of No. 23, 24, 30, . . . , and 44 is an ACK packet transmitted in response to a single DATA packet.

In contrast, the ACK difference of each of the records corresponding to the ACK packets of No. 517, 548, 552, . . . , and 559 in the packet table 111a is "2788." The ACK difference "2788" is equal to twice of the TCP payload size of a DATA packet. Thus, each of the ACK packets of No. 517, 548, 552, . . . , and 559 is a single ACK packet transmitted in response to two DATA packets. The measuring device 100 may measure an RTT by using a single ACK packet transmitted in response to two DATA packets, in accordance with the method described in step S20 in FIG. 15.

In this way, the measuring device 100 extracts ACK packets each of which is transmitted in response to a single DATA packet, selects, from the extracted ACK packets, the ACK packets that are not delayed ACK packets, and calculates RTTs. In addition, if the measuring device 100 determines that an ACK packet is a single ACK packet that has been transmitted in response to a plurality of DATA packets, the measuring device 100 calculates an RTT on the basis of the reception time of the last DATA packet among the plurality of DATA packets and the reception time of the ACK packet.

In this way, when the server 200 and the terminal device 300 communicate with each other, the measuring device 100 measures RTTs both in a period in which delayed ACK packets are not used (the period T1 in FIG. 11) and in a period in which delayed ACK packets are used (the period T2 in FIG. 11) while reducing the impact caused by a timeout that triggers a delayed ACK packet. For example, if the method discussed in Japanese Laid-open Patent Publication No. 2009-303089 is used alone, the RTT measurements are performed only in the period T2. Namely, the opportunities of RTT measurements are reduced. In contrast, with the measuring device 100, the opportunities of RTT measurements are increased. Thus, the measuring device 100 can determine change of the RTTs in each of the periods more closely. In addition, since the opportunities of RTT measurements are increased, the sample number of measured RTTs is also increased. Thus, statistical accuracy in RTT measurement is improved.

In the above description, measurements of RTTs for the communication between the server 200 and the terminal device 300 have mainly been described. If the terminal device 400 behaves in the same way as the terminal device 300 regarding ACK response control, the functions of the measuring device 100 may be used. Namely, if there is a period in which delayed ACK packets are not used and a period in which delayed ACK packets are used and if the terminal device 400 increases the window size in the period in which delayed ACK packets are not used, by causing the measuring device 100 to extract ACK packets for RTT calculation, the decrease of the RTT measurement opportunities can be suppressed.

The information processing according to the first embodiment may be realized by causing the operation unit 1c to execute a program. In addition, the information processing according to the second embodiment may be realized by causing the processor 101 to execute a program. These programs may be recorded in a computer-readable recording medium 14.

For example, by distributing the recording medium 14 in which the programs are recorded, these programs may be distributed. In addition, these programs may be stored in another computer and distributed via a network. For example, a computer may store (install) these programs recorded in a recording medium 14 or received from another computer in a storage device such as the RAM 102 or the HDD 103. The computer may read these programs from the storage device and execute these programs.

In one aspect, from ACK packets each of which has been transmitted in response to a single data packet, packets that can be used for calculating RTTs are extracted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A packet extracting apparatus comprising:
a first memory configured to hold a sequence number included in a data packet transmitted from a source apparatus to a destination apparatus, a size of the data packet, and time at which the data packet is received, which are associated with each other;
a second memory configured to hold an ACK number and a window size included in an ACK packet transmitted in response from the destination apparatus to the source apparatus and time at which the ACK packet is received, which are associated with each other; and a processor configured to perform a procedure including:
referring to the first and second memories,
determining, when a first ACK packet is an ACK packet transmitted in response to a single first data packet, whether to calculate a round trip time by using reception time of the first ACK packet on the basis of a window size included in the first ACK packet and a window size included in a second ACK packet acquired immediately before the first ACK packet, and
outputting, when the processor determines to calculate the round trip time, the round trip time calculated by using the reception time of the first ACK packet,
wherein the determining includes determining to calculate the round trip time by using the reception time of the first ACK packet when the window size included in the first ACK packet is more than the window size included in the second ACK packet.

2. The packet extracting apparatus according to claim 1,
wherein the processor determines a data packet, the sum of a sequence number and a size of the data packet matching an ACK number of the first ACK packet, to be the first data packet, and
wherein, when an ACK number of the first data packet matches a sequence number of the first data packet, the processor determines the first ACK packet to be an ACK packet transmitted in response to the first data packet alone.

3. The packet extracting apparatus according to claim 1,
wherein, among the ACK packets received before the first ACK packet, the processor determines an ACK packet, the difference between an ACK number of the ACK packet and an ACK number of the first ACK packet matching a size of the first data packet, to be the second ACK packet.

4. The packet extracting apparatus according to claim 1,
wherein the processor calculates the round trip time on the basis of reception time of the first data packet and the reception time of the first ACK packet.

5. The packet extracting apparatus according to claim 1,
wherein, when the first ACK packet is an ACK packet transmitted in response to a plurality of data packets, the processor outputs a round trip time calculated by using the reception time of the first ACK packet, irrespective of a window size.

6. The packet extracting apparatus according to claim 1,
wherein the source apparatus is connected to a wired network,
wherein the destination apparatus wirelessly communicates with an access point connected to the wired network and communicates with the source apparatus via the access point,
wherein information about the data and ACK packets stored in the first and second memories, respectively, is collected via the wired network.

7. A non-transitory computer-readable recording medium storing a packet extracting program that causes a computer to perform a procedure comprising:

receiving a data packet transmitted from a source apparatus to a destination apparatus, and storing a sequence number included in the received data packet and a size and reception time of the data packet in association with each other in a first memory;
receiving an ACK packet transmitted in response from the destination apparatus to the source apparatus, and storing an ACK number, a window size, and reception time of the ACK packet in association with each other in a second memory;
determining, when a received first ACK packet is an ACK packet transmitted in response to a single first data packet, whether to calculate a round trip time by using reception time of the first ACK packet on the basis of a window size included in the first ACK packet and a window size included in a second ACK packet acquired immediately before the first ACK packet; and
outputting, when the processor determines to calculate the round trip time, the round trip time calculated by using the reception time of the first ACK packet,
wherein the determining includes determining to calculate the round trip time by using the reception time of the first ACK packet when the window size included in the first ACK packet is more than the window size included in the second ACK packet.

8. A packet extracting method comprising:
receiving, by a computer, a data packet transmitted from a source apparatus to a destination apparatus, and storing a sequence number included in the received data packet and a size and reception time of the data packet in association with each other in a first memory;
receiving, by the computer, an ACK packet transmitted in response from the destination apparatus to the source apparatus, storing an ACK number and a window size included in the received ACK packet and reception time of the ACK packet in association with each other in a second memory;
determining, by the computer, when a received first ACK packet is an ACK packet transmitted in response to a single first data packet, whether to calculate a round trip time by using reception time of the first ACK packet on the basis of a window size included in the first ACK packet and a window size included in a second ACK packet acquired immediately before the first ACK packet; and
outputting, by the computer, when the processor determines to calculate the round trip time, the round trip time calculated by using the reception time of the first ACK packet,
wherein the determining includes determining to calculate the round trip time by using the reception time of the first ACK packet when the window size included in the first ACK packet is more than the window size included in the second ACK packet.

* * * * *